United States Patent [19]

Bartholomew

[11] Patent Number: 5,775,738

[45] Date of Patent: Jul. 7, 1998

[54] MEANS OF COUPLING OF NON-THREADED CONNECTIONS

[75] Inventor: Donald D. Bartholomew, Mt. Clemens, Mich.

[73] Assignee: Propiretary Technology, Inc., Bloomfield Hills, Mich.

[21] Appl. No.: 403,930

[22] PCT Filed: Sep. 21, 1992

[86] PCT No.: PCT/US92/08007

§ 371 Date: Mar. 20, 1995

§ 102(e) Date: Mar. 20, 1995

[87] PCT Pub. No.: WO94/07077

PCT Pub. Date: Mar. 31, 1994

[51] Int. Cl.⁶ .................................................. F16L 13/04
[52] U.S. Cl. ...................... 285/114; 285/282; 285/319; 285/321; 285/423; 285/906
[58] Field of Search ........................ 285/321, 319, 285/282, 115, 114, 423, 906

[56] References Cited

U.S. PATENT DOCUMENTS

| | | | |
|---|---|---|---|
| 2,262,585 | 7/1941 | Irmischer | 285/282 X |
| 2,295,830 | 9/1942 | Carlson | 285/115 |
| 2,318,220 | 5/1943 | Haselwood | 285/282 X |
| 2,521,127 | 9/1950 | Price | 285/321 X |
| 2,538,683 | 1/1951 | Guiler et al. | 285/321 X |
| 2,667,184 | 1/1954 | Haila et al. | 285/115 X |
| 3,439,944 | 4/1969 | Leutenegger | 285/321 |
| 3,603,621 | 9/1971 | Parsons . | |
| 3,756,632 | 9/1973 | Riggs et al. | 285/250 |
| 3,841,671 | 10/1974 | Walker | 285/321 X |
| 3,950,016 | 4/1976 | Worley | 285/114 |
| 4,008,910 | 2/1977 | Spotts | 285/282 X |
| 4,105,226 | 8/1978 | Frey et al. | 285/321 X |
| 4,243,254 | 1/1981 | Hill et al. . | |
| 4,526,411 | 7/1985 | Bartholomew . | |
| 4,593,943 | 6/1986 | Hama et al. . | |
| 4,637,640 | 1/1987 | Fourier et al. . | |
| 4,643,466 | 2/1987 | Conner et al. . | |
| 4,721,331 | 1/1988 | Lemeleichtrich . | |
| 4,750,765 | 6/1988 | Cassidy et al. | 285/321 |
| 4,810,009 | 3/1989 | Legris . | |
| 4,811,975 | 3/1989 | Paul, Jr. et al. . | |
| 4,828,297 | 5/1989 | Tarum . | |
| 4,832,378 | 5/1989 | Zepp . | |
| 4,842,306 | 6/1989 | Spotts | 285/282 X |
| 4,842,309 | 6/1989 | LaVene et al. . | |
| 4,844,515 | 7/1989 | Field . | |
| 4,850,622 | 7/1989 | Suzuki | 285/321 X |
| 4,867,484 | 9/1989 | Guest . | |
| 4,948,175 | 8/1990 | Bartholomew . | |
| 5,105,787 | 4/1992 | Imoehl . | |
| 5,275,448 | 1/1994 | McNaughton et al. | 285/321 X |
| 5,368,275 | 11/1994 | Ketcham et al. | 285/319 X |

FOREIGN PATENT DOCUMENTS

| | | |
|---|---|---|
| 0193271 | 9/1986 | European Pat. Off. . |
| 1527018 | 10/1978 | United Kingdom ........ 285/321 |
| WO92/08920 | 5/1992 | WIPO . |

Primary Examiner—Dave W. Arola
Attorney, Agent, or Firm—Harness, Dickey & Pierce, PLC

[57] ABSTRACT

A connector assembly 10 for use with tubular conduits 30 is disclosed which is a male portion that is put into a female portion. The male portion makes use of the end of the conduit itself, and the female portion only requires a stepped bore. The seal 50, stabilizing bushings areas 34 and retainer 138 are carried on the male portion. The seal 50 may be retained on the male, and the connection may be either a quick connect or require a tool to assemble. The connection may seal the highest pressures and withstand very high forces on the male and female portions. Also disclosed is the use of this connection in a multiple port device. The connection may be completed in the depth and diameter that is allotted to a "thread-in" or "flare" connection.

24 Claims, 12 Drawing Sheets

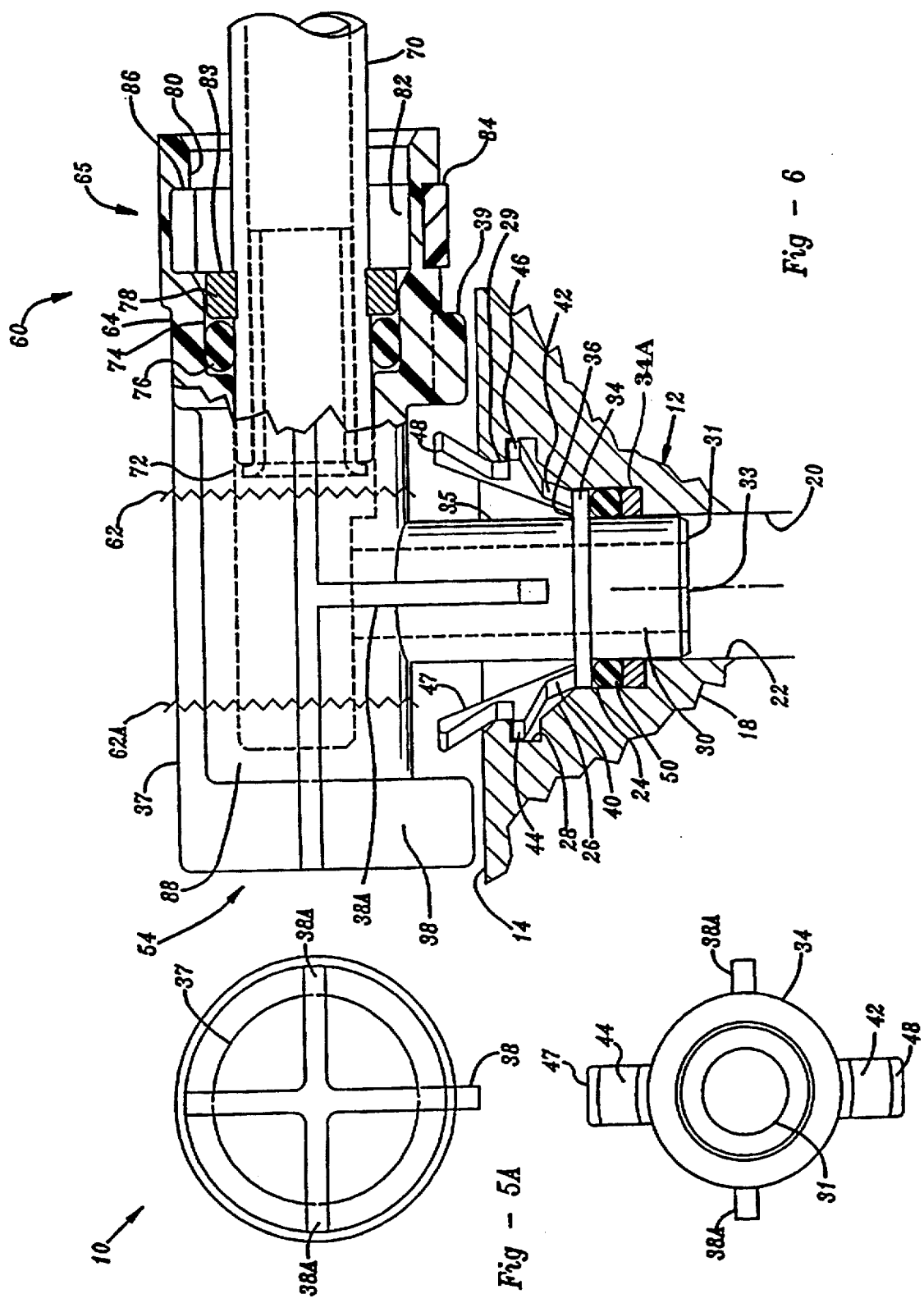

MEANS OF COUPLING OF NON-THREADED CONNECTIONS

BACKGROUND OF THE INVENTION

1. Field of the Invention

The present invention relates to a non-threaded connector assembly for providing a connection between fluid conveying conduits wherein the connector housing has a limited bore depth.

2. Description of Related Art

In the automotive industry, as well as for many other industries, the need always exists for low-cost, reliable and easy to assemble components. This need is especially apparent with respect to providing a connection between fluid conveying conduits, such as fuel or refrigerant lines.

Typically high pressure forces are associated with connector assemblies operable where the bore depth of the connector housing is limited. An assembly which can be screwed together is required. Substantial assembly time can be accumulated in screwing and properly tightening a fitting. Also, re-tightening of the fitting may be required to maintain the seal after the automobile or other system has been put into use.

Accordingly, it is the primary object of the present invention to provide a connector assembly for providing a connection between fluid conveying conduits where the connector housing has a limited bore depth.

In addition, it is an object of the present invention to provide a dual connector assembly wherein at least one of the connector assemblies is operable where the housing has a limited bore depth, and the other connects the conduit to the connection assembly.

In addition, it is an object of the present invention to provide a connector assembly that may be employed to join dissimilar electrically conducting materials that would otherwise be subject to galvanic corrosion.

Another object of the present invention is to provide swivelling conduit members which limits the forces exerted on the retaining elements, and conduits.

It is still a further object of the present invention to provide a retainer element which secures both the conduit and the sealing ring within an axial bore of the housing.

It is still a further object of the present invention to provide a connector assembly which is capable of hosting more than one conduit member.

It is still a further object of the present invention to provide a connector assembly that utilizes the actual conduit leading to the attaching point as the part of the connection that is sealed to the mating (female) portion.

It is still a further object of this present invention to show that by not having to cut or form a groove (to receive the seal) in the conduit or in the female portion, it is possible to avoid the problems that must come with a molded or machined groove for the sealing portion, that tend to produce less reliability in the sealing of the connection.

It is still a further object of the present invention to provide a connection that does not require threading to retain the mating portions together.

SUMMARY OF THE INVENTION

In light of the foregoing problems and in order to fulfil one or more of the foregoing objects and desires, there is provided a connector assembly which generally comprises a tubular conduit, a housing, sealing means, a bushing member on both sides of the sealing means and a retainer means. The tubular conduit is adapted to convey fluid and is formed with an axially extending portion having an enlarged diameter disposed at a predetermined distance from the end of the conduit to be connected. This enlarged diameter acts to hold in the sealing means, and stabilizes the male in the female. It is either a part of some non-straight connection, or a separate part that is assembled directly on to the conduit. By not requiring that a groove be put into the conduit (male) portion of the connector, and having no groove that is put into the female portion of the connector in the sealing bore, it is possible to avoid the problems of less reliable sealing that are produced by the necessity of providing a groove in the male or female sealing area. The housing (female port) that receives the expanded diameter is formed with an axial bore for receiving a conduit portion at the first end and for providing a fluid path at a second end, and includes an enlarged bore width diameter which entertains a portion of the retainer means to secure the conduit. The sealing means is disposed in the axial bore of the housing for providing a fluid-tight seal between confronting portion of the conduit and the housing. Expulsion of this sealing means is prevented by the expanded diameter portion, which also cooperates directly, or through an intermediate part, with the retaining means. The expanded diameter also acts within the sealing means bore to stabilize conduit portion of a non-straight connection, or the conduit of the fluid, in the female housing or bore. The retainer means is adapted to be disposed generally within the axial bore of the housing for cooperating with the annular projection expanded diameter of the conduit to secure the conduit in its operative position within the axial bore of the housing. This retainer means position within the axial bore of the housing. This retainer means may consist of more than one part.

Additional objects and advantages of the present invention will become apparent from reading the detailed description of the preferred embodiments which makes reference to the following set of drawings in which are shown the connection that is disclosed, and the disclosed connection in combination with other types of conduit connections.

BRIEF DESCRIPTION OF THE DRAWINGS

FIG. 6 is a side elevation view, partially in cross section of a sixth embodiment of the present invention;

DETAILED DESCRIPTION OF THE PREFERRED EMBODIMENTS

Figure 1:
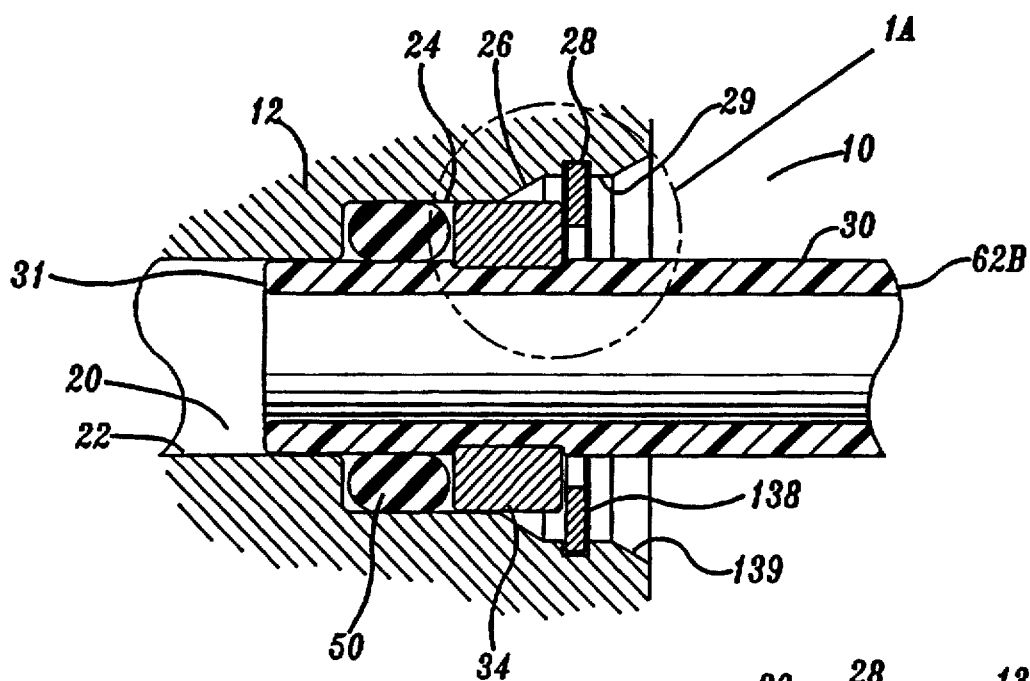
FIG. 1 is a side elevation cross section of the connection in the most simple form.

Referring to FIG. 1, a conduit 30 is to be sealingly joined and retained by a body 12 as connection 10. Body 12 is shown in FIG. 1 as a machined port in some device, but it is readily seen that body 12 could be any material, with a thin wall outside the internal bores, or a part of some other connecting device.

It is only necessary that the internal bore configuration of the connecting portion be composed of a bore 22 which will receive the end portion 31 of a liquid carrying conduit 30, a bore 24 to confine and squeeze down the outside diameter of a sealing means 50, a tapering down bore 26 that is less than 45° per side angle as measured from the center axis of the bore, a larger than bore 24 retainer bore 29, and a recessed bore 28 that is larger in diameter than retainer bore 29.

The conduit end 31 is assembled into this combination of bores.

In FIG. 1 the conduit 30 has been modified to include a (seal holding, conduit centering in the female bore, cooperating with the retainer) bushing 34 that has been assembled onto conduit 30 at a distance far enough back from the end of the conduit 31 to accommodate "piloting" in bore 22, and leave length for a seal 50, and some distance in seal bore 24 to provide a seal retaining and piloting in bore 24 function. Bushing 34 also is long enough to provide a length in tapering bore 26 to have the exterior side end of bushing 34 engage a springing retainer 138, and thus transfer the forces that would separate conduit 30 from housing female portion 12, and retain seal 50 in bore 24 with bushing 34 interior end.

Spring retainer 138 acts to receive these separation forces on conduit 30 from bushing 34, and transfer those forces to female housing 12 by means of the rear wall of recessed bore 28, which is provided in retainer bore 29 of the female body 12. A lead-in chamfer 139 serves to lead-in retainer 138. The springing retainer 138 can be a retainer that is squeezed down towards the axis of conduit 30 by the female housing body 12 using lead-in chamfer 139 and retainer bore 29 (a quick connect), or separate means (that are not shown) may be used to squeeze retainer 138 down toward the axis of conduit 30 (a non-quick connector).

The most important feature of this type of connector is that the conduit 30 itself may be used for the male portion of the male/female type connection 10. This allows the conduit 30 to be finished on the outside of conduit 30, in the area of seal 50, with a surface consistent with the requirements for sealing on the inside of seal 50. Also, this allows conduit 30 to have an expanded diameter area that acts as bushing 34 acts, combining seal retention, piloting in the seal bore 24, and cooperating with a retaining means 138. In FIG. 1 the bushing 34 is shown as a separate part that is assembled to conduit 30. Also, this combination of functions allows the retaining and sealing of a conduit (30) in the length (or depth) that is presently devoted to thread-in (not-shown), or flare-thread-in (not shown) type connections. An additional advantage is (contrary to thread-in connection), this connection will allow conduit 30 to swivel. Swivelling reduces the forces that may be applied to connection 10, and reduces the forces that may be applied to conduit 30. For the first time, by using the connection shown in FIG. 1, a manufacturer has the option of providing a female "port" of the same depth for, threaded, flare, or the connection shown in FIG. 1. The connection 10 also allows the use of an elastomeric (more easily deformed than metal) seal 50 for more reliable sealing of the connection 10.

Figure 1A:
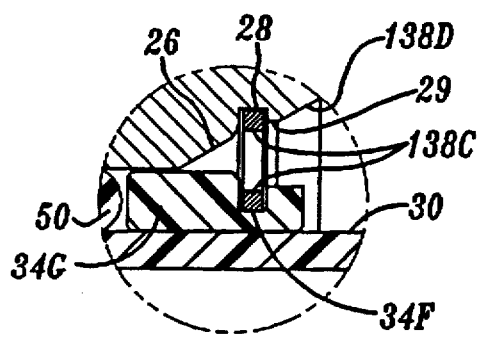
FIG. 1A is a cross section view of a slightly modified embodiment of the structure shown within the circle 1A of FIG. 1.

Referring to FIG. 1A, a retainer 138C is shown, as being fabricated from bent or formed wire, vis a vis stamped metal. The wire retainer 138C is carried by carrier bushing 34G, which has been squeezed onto conduit 30. Carrier bushing 34G has a groove 34F formed therein to receive the inner portion of wire retainer 138C. In operation, wire retainer 138C is squeezed to a smaller outside diameter by lead-in 138D into bore 29, before expanding into larger diameter 28 as the male portion is installed in the female portion of connector 10.

It can be appreciated that having a connection 10, which can be accomplished within the diameter and depth of the heretofore normal way of making a connection between a conduit and a device can be very advantageous to those who provide that connection. 62B represents an area of conduit 30 which may be a part of some other connector (not shown) or a continuation of a conduit (not shown).

Figure 2:
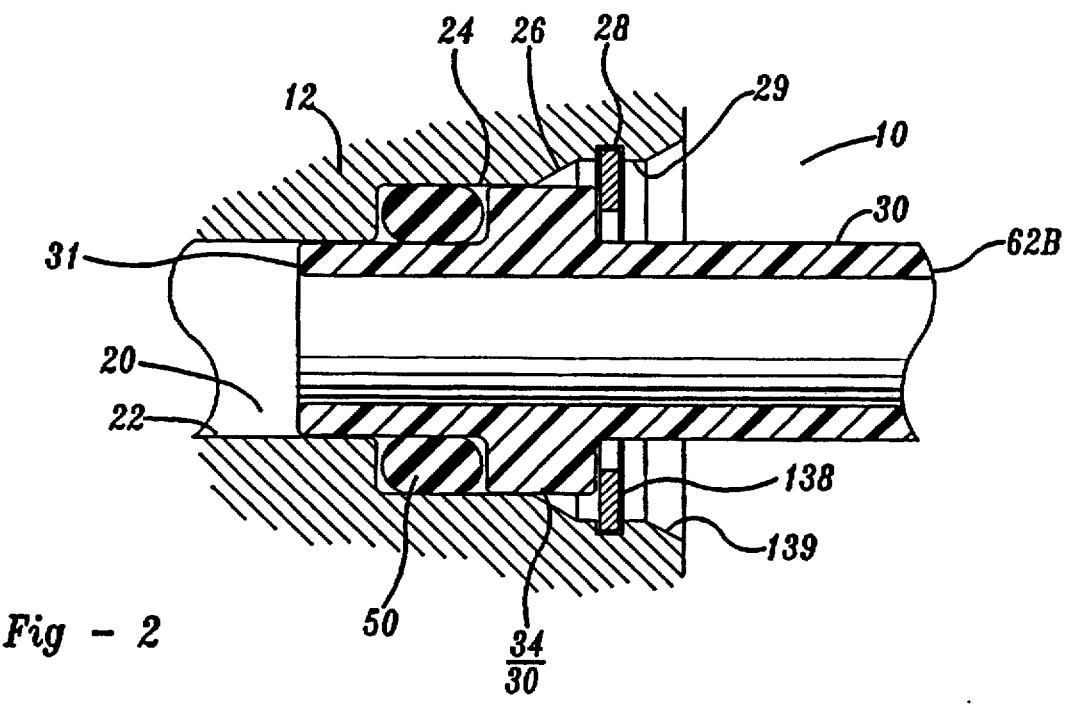
FIG. 2 is a side elevation cross section of the connection with an enlarged diameter of the conduit that also fits within the bore for the seal, stabilizes the conduit in the female seal bore, and cooperates with the retaining means.

Referring to FIG. 2 a combination bushing 34 and conduit 30 is shown as 34. Otherwise FIG. 2 is the same as FIG. 1.

To have the proper fit for piloting conduit 30 and retaining seal 50, a second diameter sizing operation may be required on bushing 34.

The combined axially extending enlarged conduit 30 diameter 34 is convenient when conduit 30 is part of some non-straight device, and it is not practical to put a non-straight bend in the type of piping or conduit (not shown) that is used.

This situation arises when it is necessary (from a practical standpoint) to use a formed device to go in between the conduit (not shown) and some female port 12, one half of connection 10.

In the case of these devices (not shown), where some non-straight devices (not shown) are used, the portion of the conduit 30 is a part of the non-straight device (not shown). It is therefore often possible to have bushing 34 of FIG. 1 combined with the conduit 30 of FIGS. 1 and 2, and become bushing area 34/30 of FIG. 2. Otherwise, the components, operation, and advantages of FIG. 1 apply to FIG. 2.

One of the most important advantages of connection 10 shown in FIGS. 1 and 2, from the standpoint of manufacturing a reliable connection (not shown), is the feature that connection 10 does not require a groove in either housing female portion 12, or conduit portion 30 to provide a reliable sealing surface for seal 50. A little thought will show that female grooves for seal 50 are not readily inspectable in small diameters, and male surface grooves, although inspectable, have "partlines" in the sealing area, if they are formed, cast or molded, for example. These "partlines" are caused by the tooling that forms, or molds, the connector portion, and they can disrupt the sealing of the connection 10. 62B represents the area of conduit 30 described in FIG. 1.

Figure 3:
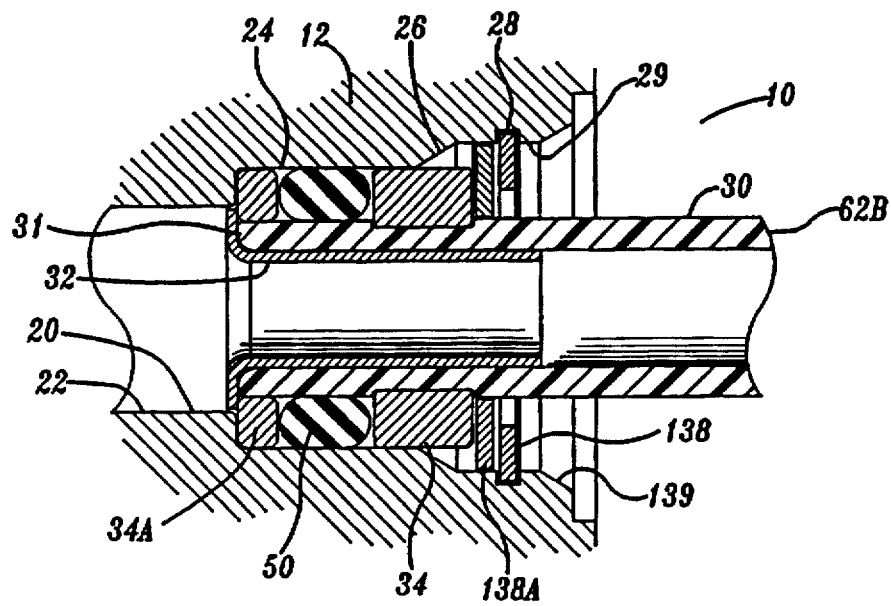
FIG. 3 is a side elevation cross section of the connection showing a retaining means that is composed of more than one part, and an added bushing conduit stabilizing means, that also acts to retain the sealing means.

Referring to FIG. 3, a connection 10 for more easily deformed conduit 30, with a seal 50 retaining means, and an intermediate retaining means 138A, is shown. Otherwise the connection 10 is the same as in FIGS. 1 and 2. Connection 10 is thus any connection using a form of the type of connection shown in FIGS. 1, 2, and 3. In FIG. 3, and additional bushing 34A has been added to retain seal 50 on conduit 30, should that function be desired. A reinforcement 32 has been added to conduit 30 in the area under (on the inside of conduit 30) the squeezed on bushing 34, which also acts to support the squeezed on the retaining bushing 34A. Bushing 34A also may act to pilot conduit 30 in the housing 12 by acting on the inner side of seal 50 in a manner similar to bushing 34 which acts to pilot conduit 30 on the outer side of seal 50.

Also shown in FIG. 3 is intermediate retainer element 138A. When one is trying to accommodate standard readily available components, and make a connection 10 which requires no more depth and diameter than a thread-in, or flare, seal, then it is sometimes desirable to use the intermediate retainer element 138A when the retainer 138 inside diameter does not properly abut the outside diameter of the end of bushing 34. 62B represents the area of conduit 30 described in FIG. 1.

Figure 4:
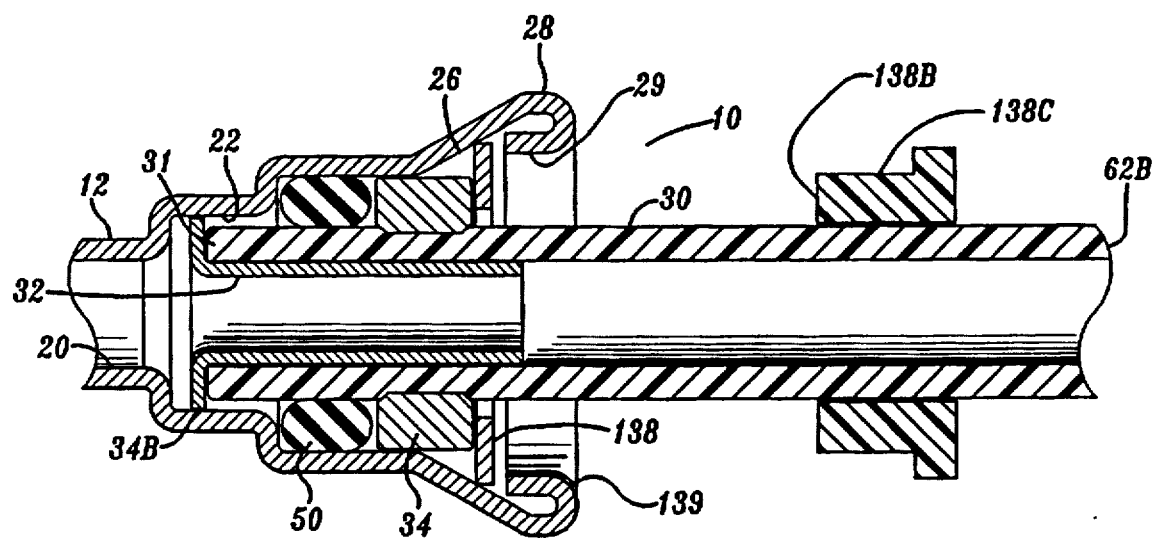
FIG. 4 is a side elevation cross section of the connection that shows a thin wall female portion, and a reinforcer for the conduit that may also act to retain the seal on the conduit, and a snap-ring installation assisting device.
Figure 3A:
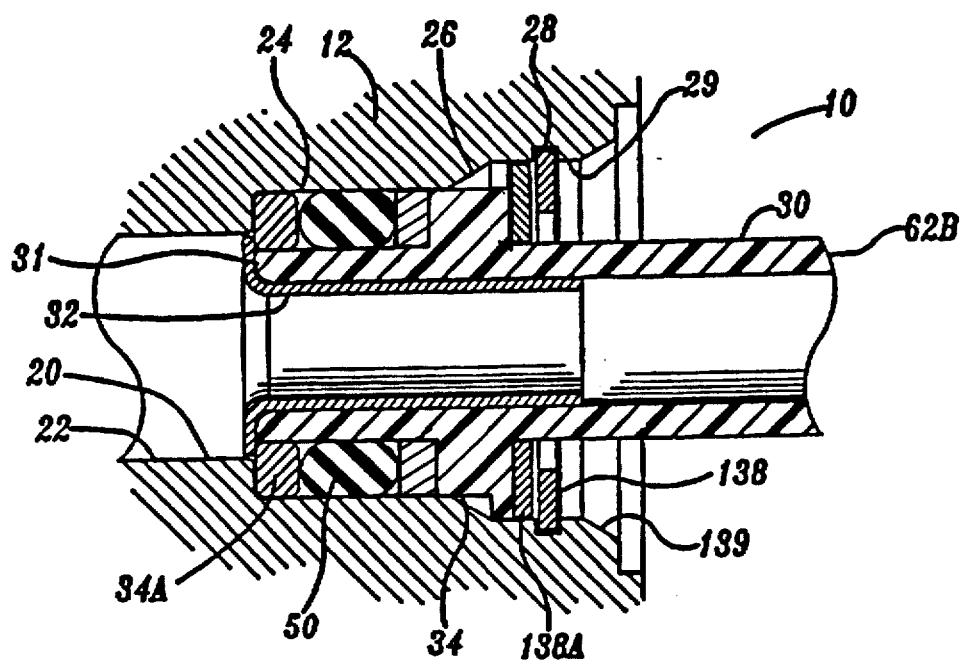
FIG. 3a is a view like FIG. 3 with an additional bushing and the expanded member being unitary with the conduit.

Referring to FIG. 4, the connection 10 is shown as in previous figures, except the flange on interior of conduit 30 reinforcing element 32 is a little larger in outside diameter 34B, and reinforcing element 32 also provides the functions supplied by squeeze on bushing 34A.

Diameter 22 is an intermediate diameter between diameter 20 and diameter 24. It is seen that the connection 10 performs in a manner similar to the manner described in earlier figures, even though the housing 12 is now a thin-walled stamped housing and port.

For example, the flanged portion 34B of FIG. 4 may be as large in diameter as seal bore 24 in FIG. 3, and take the place of squeezed on bushing 34A of FIG. 3. The connection 10 still has the male portion (conduit 30) bushinged, or piloted on each side of the sealing means 50. Sealing means 50 may consist of two O-ring seals separated by a loose (on the conduit 30) spacer (this sealing means 50 is not shown), and the connection 10 would still be consistent with the recapsulation of FIGS. 1 through 4 that follows.

Also shown in FIG. 4 is snap-ring installation assisting device 138C. The snap-ring installation assisting device 138C is centered on tube 30, and assists the installation of the snap-ring 138 in FIG. 4, and earlier figures, by presenting a face 138B that is perpendicular to the axis of the tube 30 to help install snap-ring 138. The snap-ring installation assisting device 138C can also be useful when snap-ring 138 is squeezed toward the tube 30 axis by an outside tool (not shown) by being used to push on the tool.

Snap-ring installation assisting device 138C may be manufactured to assemble over tube 30, be a complete 360° around tube 30, or be a part of tube 30 as it might well be for a construction like that of FIG. 2. When not an integral part of tube 30 the snap-ring installation assisting device 138C slides on tube 30. Assisting device 138C may also assemble over tube 30. 62B represents the area of conduit 30 described in FIG. 1.

Figure 5:
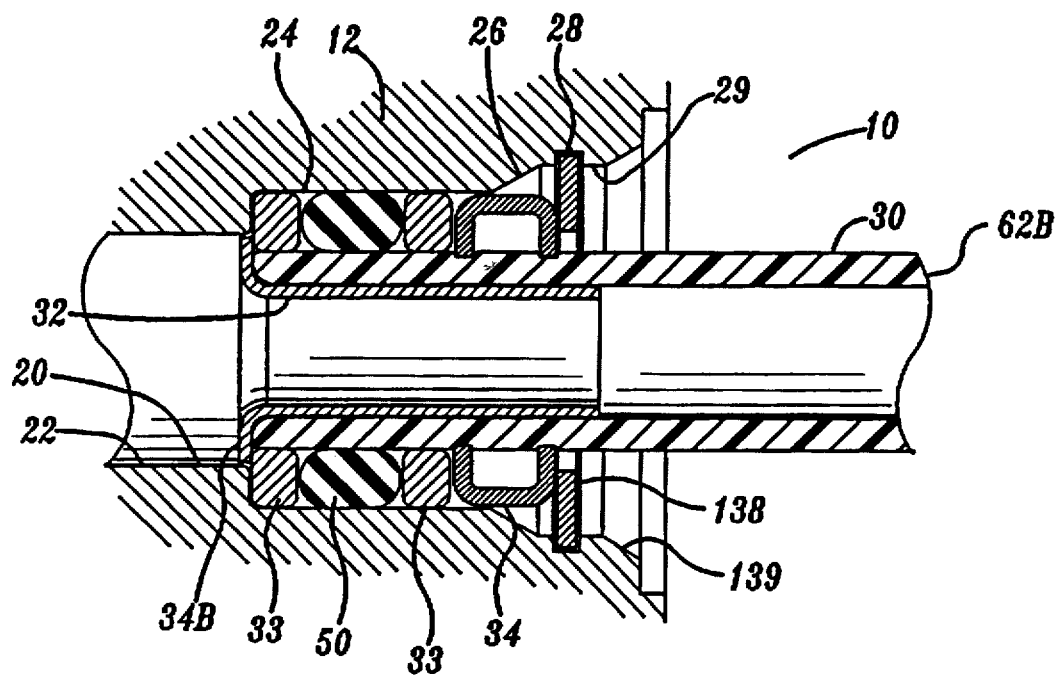
FIG. 5 is a cross sectional view of another embodiment of the connector.
Figure 5A:
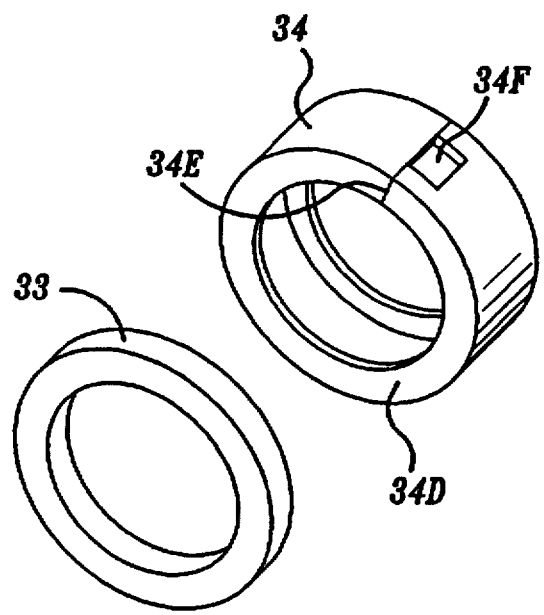
FIG. 5A shows details of a portion of the conduit that will act as an expanded diameter.

Referring to FIG. 5, the disclosed connector 10 is shown in another embodiment. The no-sealing defeating surface of the tubular portion 30, under sealing means 50 is still the same. Note that in the previous FIGS. 1–4 that this feature is being maintained, even in the case of FIG. 2 where the tubular portion axially extending enlarged conduit 30 diameter portion 34 (see FIG. 2) is cast or molded onto conduit portion 30. In the FIG. 2 case the casting or molding method puts at least the portion of the male part of the connection 10 that goes into bore 24 all in a female portion of the tooling, so there are no parting lines that may defeat the sealing of the inside diameter of sealing means 50.

In any connection between a conduit and a device, or conduit and a conduit, there are two (2) first considerations: sealing of the two halves (in the case of connector 10 a male and female), and the retention together or the two halves of the connection.

The sealing requirement of the disclosed connection 10 is not encumbered by a manufacturing process that could leave axial, or around the circular surface, lines or marks that would tend to defeat the sealing. The male half has been primarily discussed, but one schooled in making bores will realize that the female half has also been treated so as to not have any recessed diameter sealing means bore. The female bore may be produced with a "form drill" and a "form reamer" in all but the bigger recessed bore 28 for the retainer 138, assuring both concentricity and a surface of bore 24 that is good for sealing. To reduce the accommodation of movement required by the sealing means, it is necessary to stabilize the male within the female. This is accomplished in the connection 10 by having a pilot, or bushinged area, on each side (along the connector 10 axis) of the sealing means.

This is most true for an O-ring (as shown in the figure) sealing means, and less true for other elastomeric sealing means like "U" cup or other types of seals that are more tolerant of male axis—female axis relative movement in the sealing area. The bushings consist of two bushings 33 and ring 34 in the FIG. 5 case. In previous figures, the bushings have involved the conduit expanded diameter area 34 and other means that include the housing bore and the conduit end (FIGS. 1 and 2), or a separate busing at the conduit end (FIG. 3), or the flanged end of a conduit reinforcing means (FIG. 4). All of these are different means of producing the desired result of piloting the conduit (male) in the housing (female) on each side of the sealing means.

The second principal factor is the retention together of the male and female portions of a connection.

The author of this patent has devised a means of providing an abutting surface that can be mounted on tubing (or conduit) very easily and quickly. This means is more adequately described in a different patent application, but is included here in FIG. 5 to show that a bushing 33 may be used between this means and the sealing means so to serve both the purpose of providing a bushing (as above described) and a smooth surface for the side of the sealing means so to abut. In use this will prevent damage to the sealing means so by any uneven edge 34E of bushing 34.

In FIG. 5 bushing 33 may provide the outside diameter required for the fit to bore 24, and it is not necessary for bushing 34 to provide that closely held diameter. This means that bushing 34 can be somewhat smaller in outside diameter than bushing 33, and thus have a larger tolerance of outside diameter.

In FIG. 5, bushing 34 is used primarily in the retention means function. Flanges 34D of bushing 34 deform the conduit 30, and because of their strength and the conduit deformation (which is limited by closing up the gap at the ends of the formed ring—see 34E), bushing 34 provides the resistance to forces that would separate conduit 30 from housing 12 of the female. Bushing 34 now may be used as an abutting surface for the retaining means, which is snap-ring 138. Snap-ring 138 acts to transfer these separation forces from conduit 30 to the female abutting wall 27, as in FIGS. 1 through 4.

As an incidental that is not really a part of the discussion above about bushing 34, bushing 34 may be sprung open sufficiently to be installed over conduit 30 by use of a screw driver, or some other tool by use of area 34F.

It should also be noted that in FIGS. 1 through 5 that the disclosed type of connector 10 will allow the conduit 30 (male) swivel relative to the female. This swivelling is very important to reducing the mechanical stresses and forces on not only the female, but on the complete system leading to and from connection 10, as well as the male.

Re-capsulation of FIGS. 1 through 5: FIGS. 1 through 5 have shown a method of making a connection that has the following features:

The connection is made with a male portion (the conduit and the parts added onto, or in the conduit) which is sealably connected to a female port (of the proper male end receiving shape).

The retention of the connected male and female portion is performed by a retainer which locks into a groove that is put into a female bore in the case of a machined female bore, or in as a recess in a stamped female housing, or through the female portion from the exterior of the female portion as will be shown in a later figure.

The retaining means merely acts to transfer the forces that would act to separate the male from the female portion by transferring the separating force from the back side (not the outside diameter) of an axially extending enlarged diameter of the conduit to an abutting wall provided in the female portion by the rear of the groove that receives the snap-ring.

The retaining means is a springing device that may be squeezed down in diameter by a tool, or by the female housing or a stamped female. Or, installed by hand or tool (again squeezing down, again by the female housing) through the female housing in the case of a molded housing where it is practical to use "windows" through the wall making the outside and inside surfaces of the female housing. The retaining means may be more than one part.

The axially extending enlarged diameter of the conduit may either be a part of the conduit or added onto the conduit: But it must serve the following purposes.

Act with the retaining means to prevent separation of the male from the female.

Support the male portion in the female portion.

Prevent the sealing means from being expelled from the female portion.

In front of the sealing means (deeper into the female) a second means of piloting the conduit portion (male) in the female.

This is done without having to put part lines from molding, that can be introduced by making a groove in the conduit, or other possible sealing disruptors on the conduit surface where the sealing means seals the conduit. The seal is to the conduit portion, not some intermediate member in that area, and not by means of a groove formed in the male conduit or female housing.

Any second means of piloting is added over the conduit, or from the inside of the connector housing, directly on the conduit. The inner bushing is separate from the conduit to preserve the sealing area of the conduit, and to prevent the seal from being separated from the conduit.

The sealing means is any elastomer configuration, or combination of elastomeric with the appropriate separator, etc.

The combination allows the manufacture of a connector in the diameter and length occupied by a thread-in connector, or a flared thread-in (to retain) connector.

The connector of FIGS. I through 5 is constructed in a manner that is easier to accomplish when a very reliable connection, that requires very little of the installer, is desired.

The connection swivels.

The connector female may have the capability to squeeze down the retaining means to a smaller outside diameter. No outside tool is required to perform this function.

This type of connection can be used to connect the conduit itself (which is used as a male) to a female port, and have the sealing required take place on the conduit itself, with no threading required to secure the male portion to the female portion. In the case of a conduit that can be bent, within the envelope of space that is available, the connection can be made with no welding, or screwing, or separate connection of the conduit leading to the attaching point.

The combination of providing a connection in the manner described in FIGS. 1 through 5 provides a combination of features that is highly desirable to those who must make a connection that will fit within the space provided for the smallest connections (for the conduit size) that have been heretofore used.

DETAILED DESCRIPTION OF OTHER PREFERRED EMBODIMENTS

Referring to FIG. 6, a side elevation view of a connector assembly 60 according to the present invention is shown partially in cross-section. The housing 12 of the connector assembly 60, is comprised of an axial bore 20, a circumferential lip 14, a body 18 and a fluid conveying conduit 30. The axial bore 20 is comprised of various sections and is adapted to receive and assist in securing the conduit 30. A first bore portion 22 has a reduced diameter for hosting the terminal end 31 of the conduit 30 upon insertion. A second bore portion 24 hosts both the elastomeric sealing ring 50 and the axially extending enlarged diameter portion 34 of conduit 30. This enlarged axially extending portion 34 is provided with deformable arm members 40 and 42 which extend from a wall portion 36 transversely disposed to the central axis 33 of the conduit 30.

The housing 12 is also provided with a tapered bore portion 26 which hosts the basilar portion of the extending arm members 40 and 42. Flanges 44 and 46 extending from arms 40 and 42 fit within axial bore portion 28 to secure the conduit 30 within the housing 12. Distally located on the extending arms are tabs 47 and 48. By squeezing the tabs toward each other, flanges 44 and 46 are released from axial bore portion 28. With the arm members 40 and 42 disengaged from axial bore portion 28 the conduit 30 may be separated from housing 12 by pulling the conduit away from the housing.

Typically, through automotive operations, forces are exerted upon the conduit 30 which in turn are transferred upon the extending arm members 40 and 42. Over time the forces transferred upon the arm members would tend to cause wear and tear which eventually would make the conduit assembly inoperative. To alleviate this problem conduit portion 35 disposed axially outwardly from the enlarged diameter portion 34 is made of a relatively flexible material which allows the conduit to partially flex when forces are exerted upon the conduit. This flexion serves to limit the forces transferred to the extending arms which directly results in a longer operational life for the conduit assembly. This embodiment is very usable in situations of lower pressure and "limited break the connection off" forces.

The conduit portion 35 which extends axially outward from the enlarged diameter portion 34 of the conduit 30 branches perpendicularly to the central axis 33 to allow for elbow or T-type connections. This branching occurs once the conduit extends to a point where the branching portion will clear the tab members 47 and 48 of the conduits extending arms 40 and 42. Pivoting members 38 and 39 extend from the branching portion 37 of the conduit 30. If forces are exerted upon the branched conduit portion 37, the pivoting members 38 and 39 pivot against the circumferential lip 14 of the housing 12. Reference to the partial end view of the lower portion of the connection shows ribs 38A which are at 90° to ribs 38. Ribs 38A contact retainer bore 29, and limit movement at 90° to ribs 38. As mentioned this pivoting tends to limit the forces exerted upon the extending arm members 40 and 42 which, in turn, increases the operation life of the conduit assembly.

Provided at a distal end of connector 60 of the branched conduit portion 37 is a second connector assembly 65 that is similar to FIGS. 1 through 5, except that the retainer 82 is of the type that penetrates the outside wall of a female housing 64. This connector assembly may generally be of varying types as illustrated by FIGS. 9–18, so long as the housing portion provides adequate clearance for the extending tabs 47 and 48.

The second connector assembly 65 which is shown in FIG. 6 by break point line 62, comprises a housing 64 which serves to adjoin conduit 70 to give a branched fluid transfer system. The internal composition of this housing contains a first axial bore portion 72 which is contiguous to the outer diameter of conduit 70. A second bore portion 74 has a slightly larger diameter and houses an O-ring seal 76 and a bushing 78 which has been assembled to conduit 70.

Housed within a third axial portion 80 is retainer 82 which has one wall 83 contiguous to a wall of bushing 78 and another wall 84 both of which abuts a female abutting area 86 occurring at the distal most end of housing 64. Retainer 82 is typically of the known variety which can be sprung open by the passage of bushing 78, or may be later installed after installation of tube 70. The second connector assembly 65 is a version of the connections 10 of FIGS. 1–5, except a retainer portion 80 through 86, which is consistent with the molding or casting method of producing the required exterior and internal details of the connection 10 that is shown in FIGS. 1–5. The connection may also have third arm (not shown) by reproducing the second connection 54 at the end that is marked 88 in FIGS. 5, and separated by line 62A.

Figure 7:
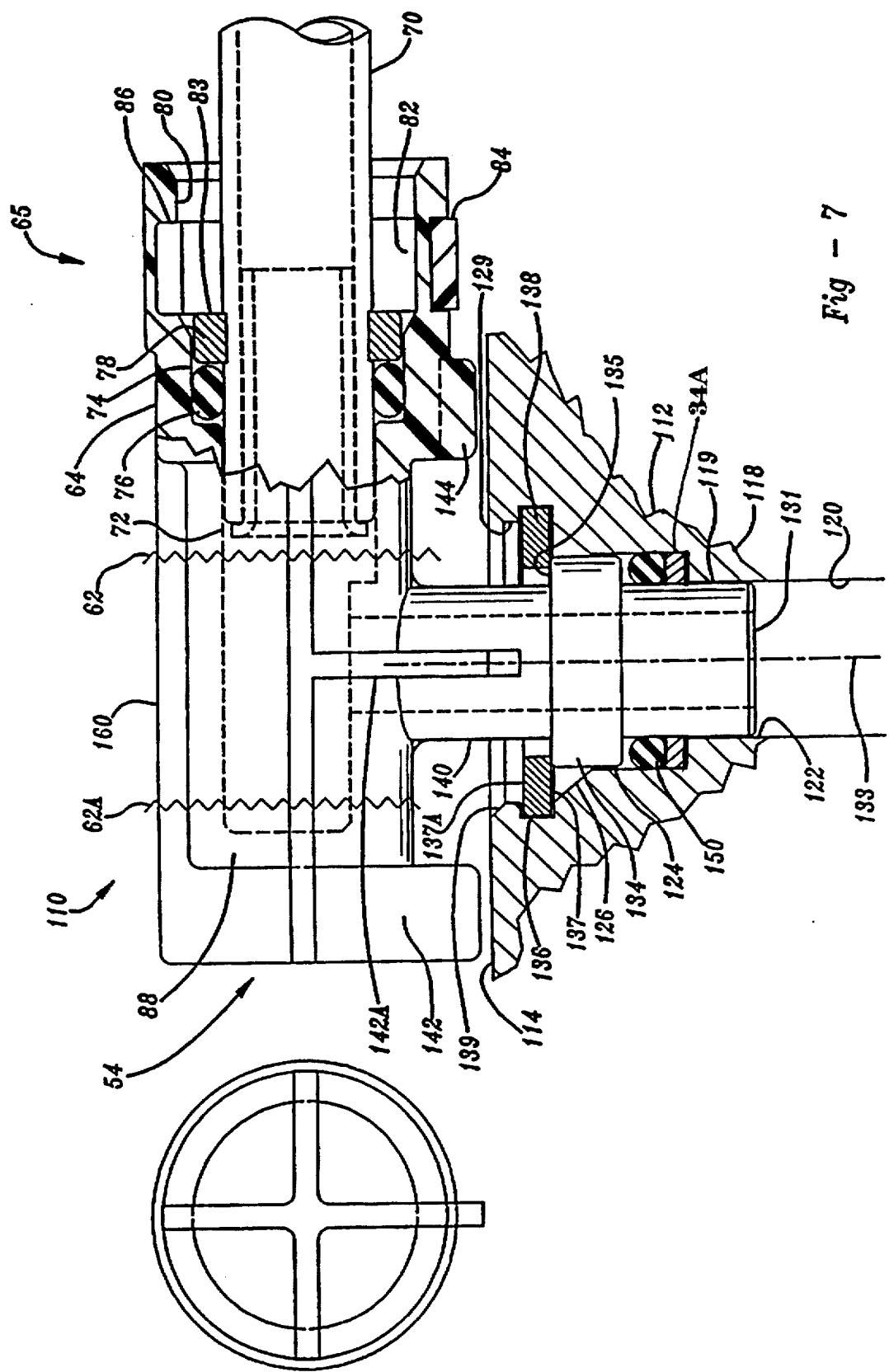
FIG. 7 is a side elevation view, partially in cross section of a seventh embodiment of the present invention.

Referring to FIG. 7, a side elevation view of a connector assembly 110 according to the present invention is shown partially in cross-section. This connection 110 is a combination of the connectors disclosed in FIGS. 1–6. The housing 112 of the connector assembly 110, is comprised of an axial bore 120, a circumferential lip 114, a body 118 and a fluid conveying conduit 119. The axial bore is comprised of various sections and is adapted to receive and assist in securing the conduit. A first bore portion 122 has a reduced diameter for hosting the terminal end 131 of the conduit 119 upon insertion. A second bore portion 124 hosts both the elastomeric sealing ring 150 and the axially extending enlarged diameter portion 134 of conduit 119. Upon insertion of the conduit, this axially extending enlarged diameter portion and tapering bore 126 compresses the sealing ring 150 to provide a fluid tight seal. The initial distortion of sealing ring 150 takes place in tapered bore 126.

The housing 112 is also provided with an enlarged bore width diameter 136 which hosts a retaining element 138 which fits over the outer periphery of the conduit stem 140. The retaining element is of the well known spring-type which will spring open outwardly once in position. When the retaining element 138 is sprung open to engage the walls of the enlarged bore width portion 136, the basilar surface 137 of retaining element 138 engages the outer wall 135 of the axially extending enlarged diameter 134 to secure the conduit within the housing 112. The outside basilar surface 137A of retainer 138 cooperates with the abutting wall that occurs between the entry diameter 129 for the retainer 138, and the retainer recessed diameter 136, to transfer the pull apart forces of conduit 119 from body 112.

The stem portion 140 of the conduit 119 extends axially outwardly from the enlarged diameter portion and is typically made of a relatively flexible material which allows the conduit to partially flex when forces are exerted upon the conduit. This extending conduit portion 140 branches perpendicularly to the central axis 133 such that pivoting members 142, 142A and 144 are allowed to extend from the branched conduit housing 160. These pivoting members 142, 142A and 144 pivot against the circumferential lip 114, entry chamfer 139 and retainer bore 129 of housing 112 serving to alleviate the forces exerted upon the conduit extension 140. The second connector assembly 65 incorporated as part of FIG. 7, at break point line 62 is the same as that described in FIG. 6. Both connector portions of FIG. 6 are similar to the connection 10 shown in FIGS. 1 through 6. An additional connector portion may be added, that projects from line 62A.

Figure 8:
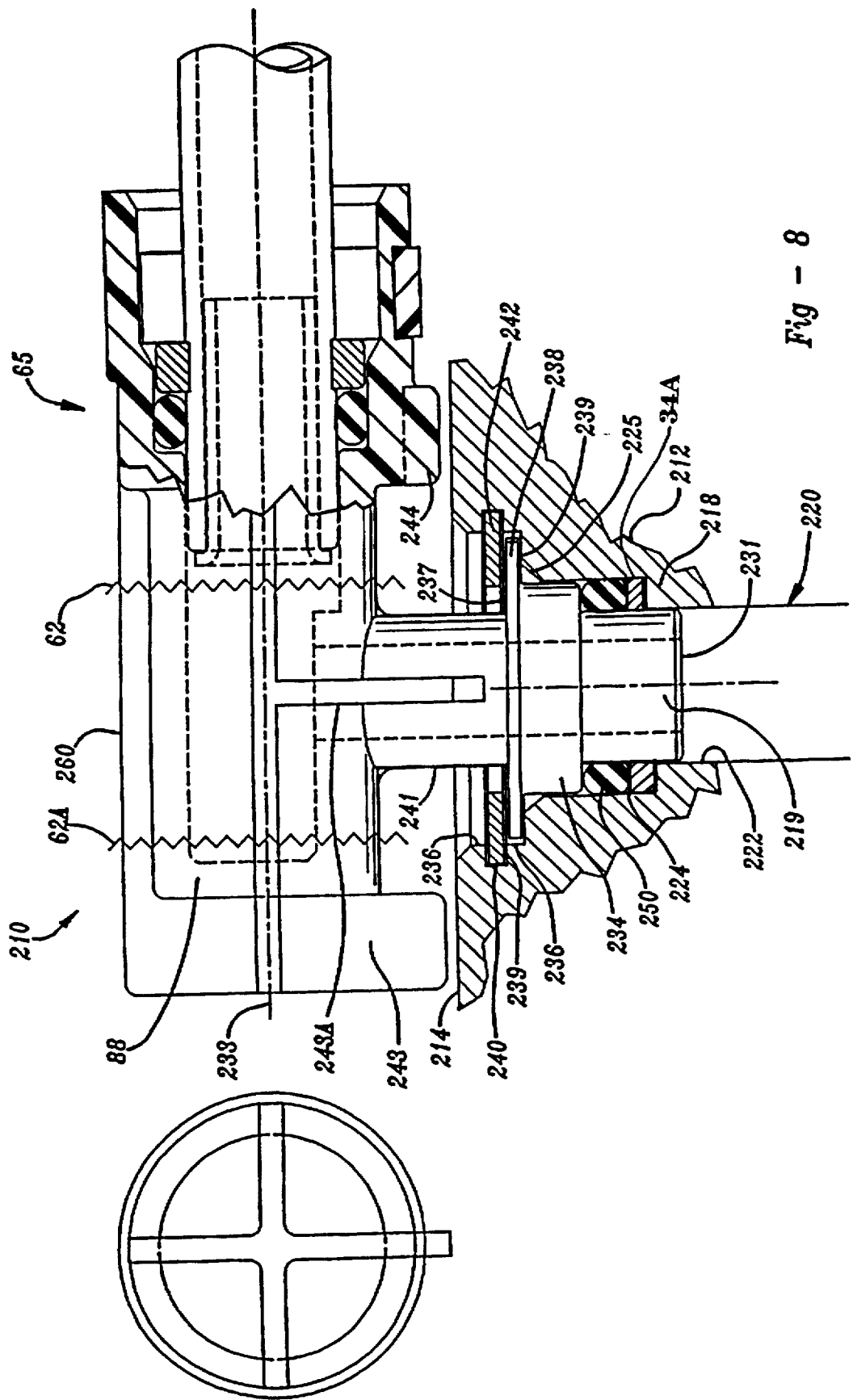
FIG. 8 is a side elevation view, partially in cross section of an eighth embodiment of the present invention.

Referring to FIG. 8, a side elevation view of a connector assembly 210 according to the present invention is shown partially in cross-section. The housing 212 of the connector assembly 210, is comprised of an axial bore 220, a circumferential lip 214, a body 218 and a fluid conveying conduit 219. The axial bore is comprised of various sections and is adapted to receive and assist in securing the conduit. A first bore portion 222 has a reduced diameter for hosting the terminal end 231 of the conduit upon insertion. A second bore portion 224 hosts both the elastomeric sealing ring 250 and the axially extending enlarged diameter portion 234 and further enlarged diameter of conduit 219. Further enlarged diameter 238 serves the function of 138A in FIG. 3. Upon insertion of the conduit, this axially extending enlarged diameter portion 234 urges seal 250 into the bore, and tapering bore 225 distorts the sealing ring to provide a fluid-tight seal.

The housing 212 is also provided with an enlarged bore width diameter 236 which hosts the outer circumference of a retaining element 238 which is formed as a part of axially extending enlarged diameter portion 234. Retaining element 242 fits over the extending stem portion 241 of conduit 219 so that a bottom wall 239 of the retaining element 242 abuts the axially extending enlarged diameter portion 238 at a top wall 237. Housing 212 also has a third bore 240 with a slightly larger diameter that hosts a retaining element 242 of the spring open type. This retainer 242 rests upon the top wall 237 of the first axially extending enlarged diameter portion 234 and is sprung open such that this retaining element 242 engages the walls of the enlarged third bore 240. The retainer 242 becomes locked-in by the walls of the transition from bore 240 to bore 236 thereby retaining the conduit 219 to provide a fluid-tight seal.

The stem portion 241 of the conduit 219 extends axially outwardly from the enlarged diameter portion and is typically made of a relatively flexible material which allows the conduit to partially flex when forces are exerted upon the conduit. This extending conduit portion 241 branches perpendicularly to the central axis 233 and pivoting members 243, 243A and 244 extend from branched conduit housing 260. These pivoting members 243, 243A and 244 pivot against the circumferential lip 214 and retainer diameter 236 of housing 212 serving to alleviate the forces exerted upon the conduit extension 241.

The second connector assembly 65 incorporated as part of FIG. 8, at break point line 62 is the same as that described in FIGS. 1–7, and a third conduit (not shown) may also engage a connector portion that is like connector portion 65 that is placed at break point 62A, which is also shown in FIGS. 6 AND 7, and extends from 88 in FIG. 8.

Figure 9:
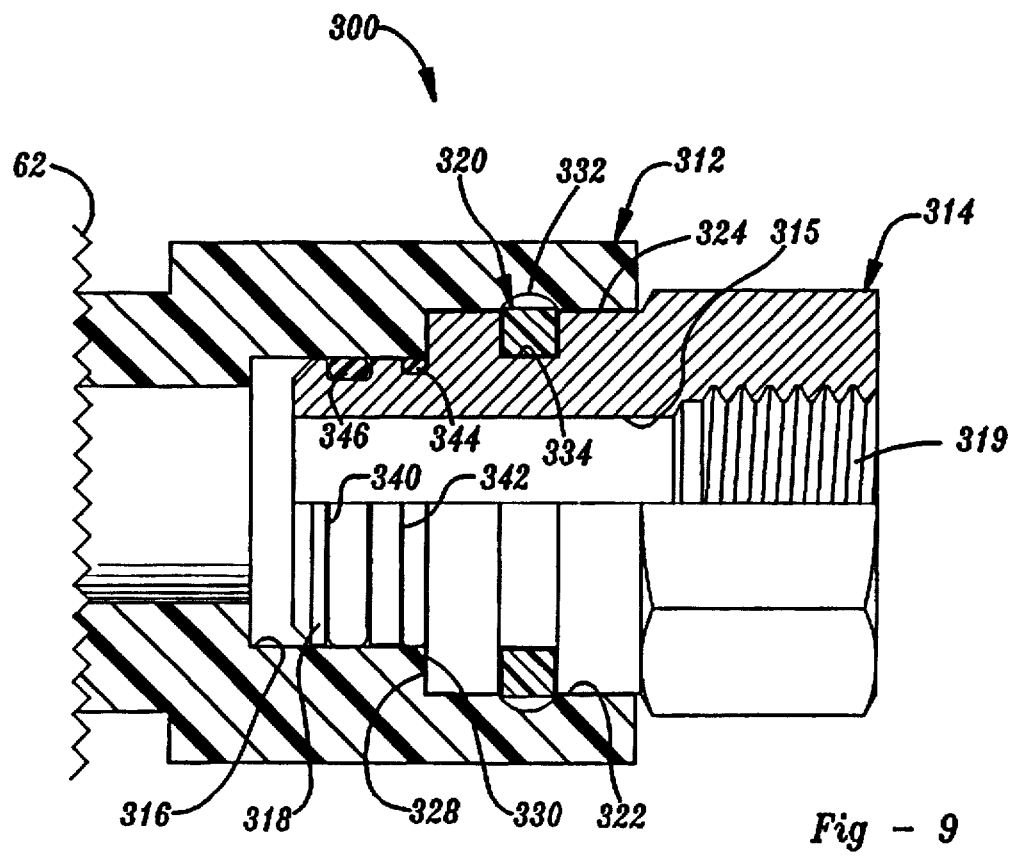
FIG. 9 is a side elevation view, partially in cross section of a first alternative connector assembly adaptable to be combined with the non-threaded small bore depth connector portions of FIGS. 1–8.

Referring to FIG. 9, a side elevation view of a connector assembly 300 which can be incorporated at the distal end 60 of the branched conduit portion of FIGS. 6, 7 and 8, at break point line 62 as the second connector assembly 65, is shown. The terminal end similar to 60 in FIG. 6 of the branched conduit is provided with a connector housing 312 which serves to adjoin another conduit (not shown). The connection 300 shown in FIG. 9 is the type with a grooved male (344, 346) and is retained by a snap-ring 320 in grooves 332 and 334. Note that a conduit is threaded into 314 at 319.

The connector assembly of FIG. 9 comprises a housing 312, a coupling member 314 and a retaining pin 320. The housing has a generally cylindrical configuration body although the external dimensions may be any other shape so long as clearance is maintained between this housing 312 and the housing as shown in FIGS. 6, 7 and 8 which secures the conduit.

Figure 15:
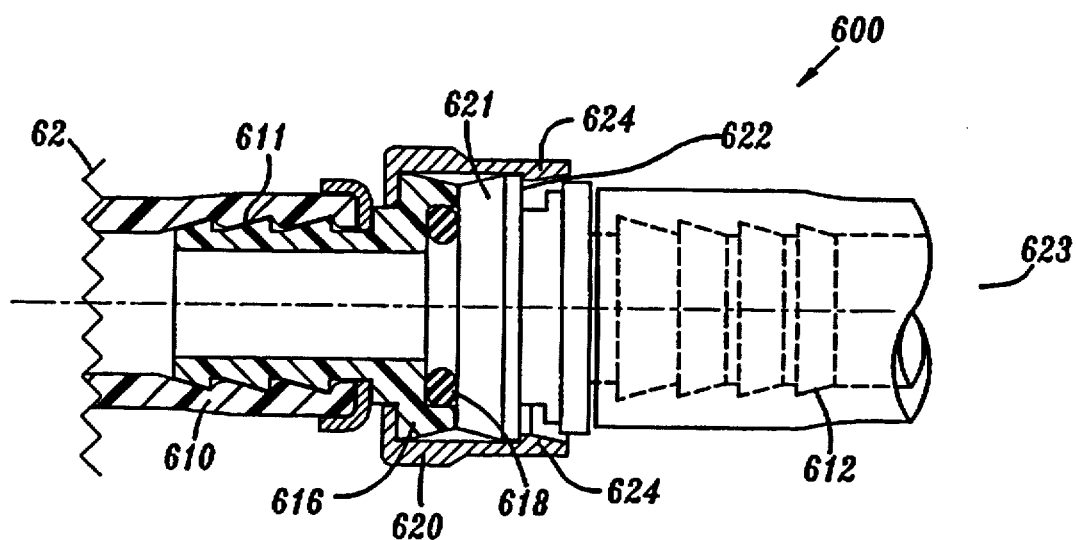
FIG. 15 is a side elevation view, partially in cross section of a seventh alternative connector assembly adaptable to be combined with the non-threaded small bore depth connector portions of FIGS. 1–8.
Figure 17:
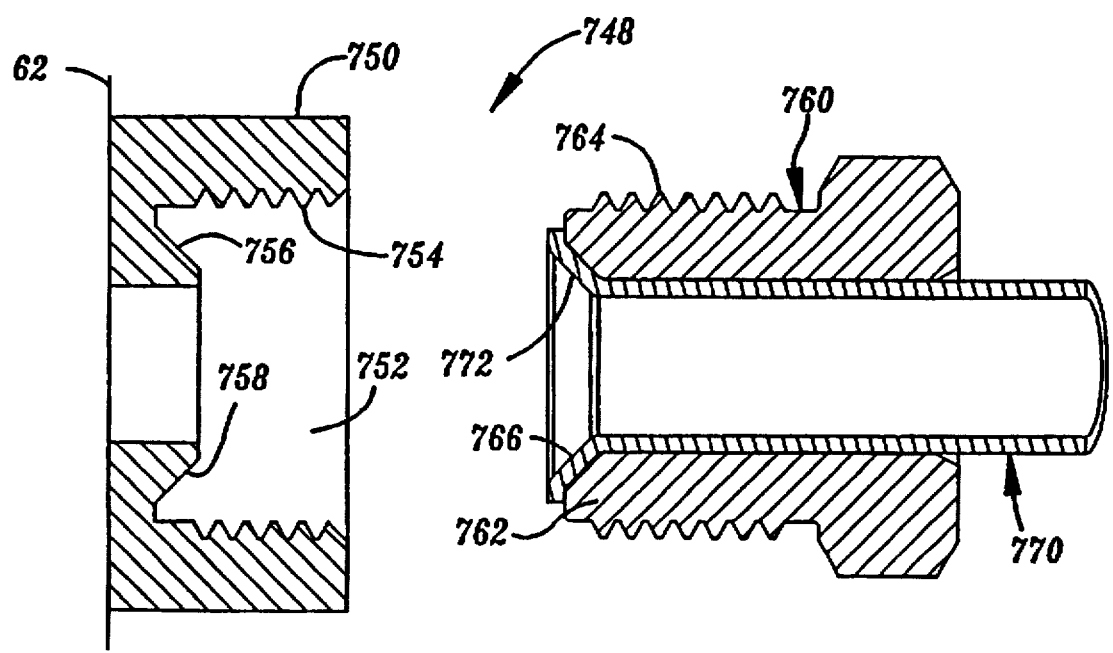
FIG. 17 is a side elevation view, partially in cross section of a tenth alternative connector assembly adaptable to be combined with the non-threaded small bore depth connector portions of FIGS. 1–8.

The connections shown in FIGS. 9, 10, 15 and 17, require a connection to a separate conduit, refer to 319, 360, the two conduits of FIG. 15, and 770 of FIG. 17. These figures are good examples of that type connection, which is different from the connections of FIGS. 1–8 where the conduit itself is used. Either part of the connection (300 in FIG. 9) may be used. In FIG. 9 the end 314 could be (without the thread) connected at 60. Where a connection consisting of two parts is shown in a figure, either part could be used.

The internal construction of the housing 312 has a first cylindrical bore 316 having a diameter which is contiguous with a reduced diameter body portion 318 of coupling 314, and an enlarged cylindrical bore 322 which is generally contiguous with the main body portion 324 of coupling 314. The coupling member 314 has a bore 315 having an enlarged diameter portion which contains threads 319. A wall 330 interconnects bores 316 and 322 and is generally contiguous with wall 328 of the coupling member 314. An annular semi-circular groove 332 is located on the interior wall of bore 322 and is located opposite an annular rectangular groove 334 of coupling member 314.

Coupling member 314 also contains two spaced peripheral grooves 340 and 342 on reduced diameter portion 318. A sealing member 344, typically of an O-ring construction is inserted into groove 342 to provide an outside seal. Another O-ring 346 is inserted into groove 340 to provide a primary seal. The O-rings 344 and 346 both contact and compress against bore 316 to provide a fluid-tight seal upon assembly. Two openings (not shown) extend through the body of housing 312 and are radially aligned with grooves 332 and 334. A standard U-shaped retaining pin 320 is inserted into the assembly by passing its legs (not shown) through the two openings contained on housing 312, radially aligned with grooves 332 and 334, thus locking the members 312 and 314 together. Once complete connection has occurred, fluid may now flow leak-free throughout the connector system. Coupling 300 is of the type that requires the forming or machining of grooves for seals 344 and 346. The type of connection 10 that is disclosed does not require the forming or machining of these grooves as shown for coupler 314.

Figure 10:
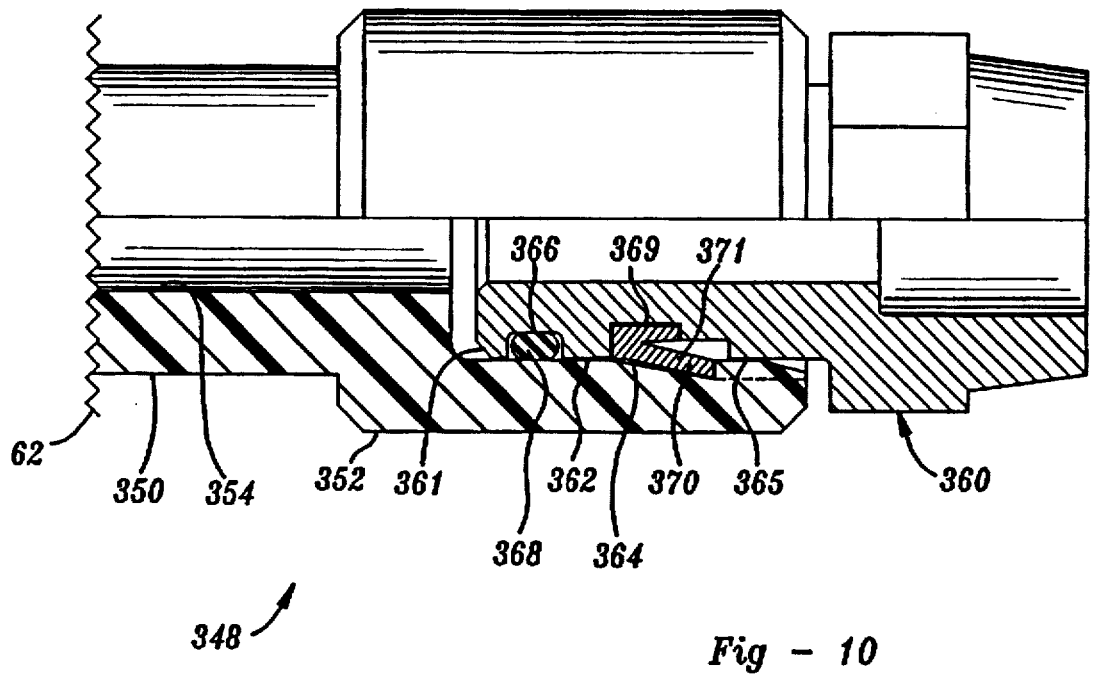
FIG. 10 is a side elevation view, partially in cross section of a second alternative connector assembly adaptable to be combined with the non-threaded small bore depth connector portions of FIGS. 1–8.

Referring to FIG. 10, a side elevation view of a connector assembly 348 which can be incorporated at the distal end 60 of the branched conduit portion of FIGS. 6, 7 and 8, at break point line 62 as the second connector assembly 65 is shown. The terminal end 60 (see FIG. 6) of the branched conduit is provided with a connector housing 350 which serves to adjoin another conduit via a coupling member 360. Connection 348 is of the type which involves a seal groove 366, and a bonding operation of any conduit to male portion 360. Note that the coupling 10 does not require the separate connection of a conduit.

The connector assembly 348 comprises the housing 350, the coupling member 360, and a retention ring 370. The housing 350 has a generally cylindrical configuration body 352 although the external dimensions may be of any other shape so long as clearance is maintained between this housing 350 and the housing as shown in FIGS. 6, 7 and 8 which secures the conduit.

The internal construction of the housing 350 has a first cylindrical bore 354, an enlarged second cylindrical bore 362 which is contiguous with the leading end 361 of coupling member 360, a transitional third bore portion 364, and a fourth bore 365 which initially receives the coupling member 360.

Coupling member 360 contains a peripheral groove 366 near its leading end 361 which houses an O-ring seal 368 which prevents fluid loss. The coupling member also contains a peripheral groove 369 which retains ring 370. Radially extending arms 371 extend from ring 370, which upon complete insertion of the coupling member 360 into the housing 350, spring outward to engage the wall that is created when transitional third bore 364 ends thereby preventing the undesired separation of the coupling member 360 from the housing 350. Once complete connection occurs fluid may now flow leak free throughout the connector system. This type of connector has retaining means 370 that is distorted upon entry to housing 350, but requires a groove 366 for seal 368, and the disclosed connector does not require a groove for the sealing means.

Figure 11:
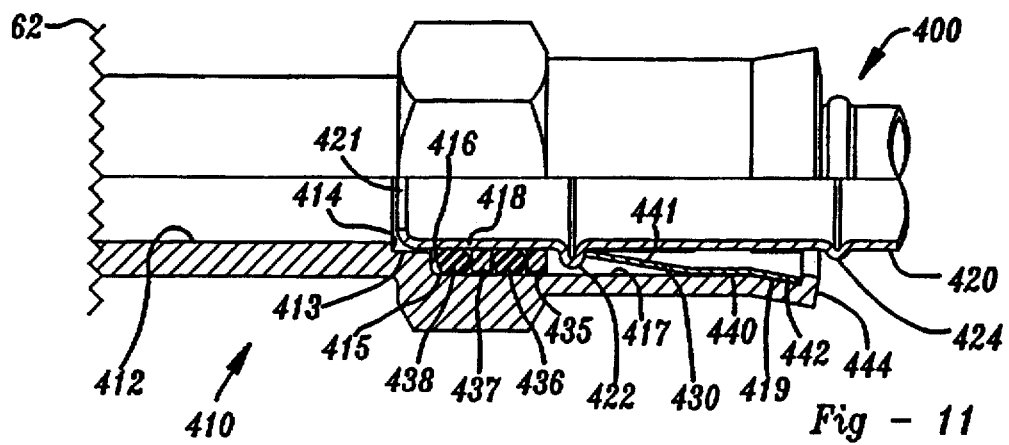
FIG. 11 is a side elevation view, partially in cross section of a third alternative connector assembly adaptable to be combined with the non-threaded small bore depth connector portions of FIGS. 1–8.

Referring to FIG. 11, a side elevation view of a connector assembly 400 which can be incorporated at the distal end 60 (see FIG. 6) of the branched conduit portion of FIGS. 6, 7 and 8, at break point line 62 as the second connector assembly 65, is shown. The terminal end 60 (see FIG. 6) of the branched conduit is provided with a housing 410 which serves to interconnect with another conduit 420. This type of connector does not employ male or female seal grooves, but does not contain a part which acts between the bead on the tube and the retaining means as shown in later FIG. 18, which is necessary in some cases, or in front of a bead that is part of the conduit because the bead does not fit the seal bore to pilot the conduit and keep the seal in.

The connector assembly 400 comprises the housing 410, the tubular conduit 420, a tubular retainer 430, bushings 435 and 437, and sealing rings 436 and 438. The action of bushing 435, which is normally pressed in, holds the seals. It is possible, but not used for other reasons, that conduit 420 bead 422 act to hold in the seals. The housing has a generally cylindrical body configuration although the external dimensions may be of any other shape as clearance is maintained between this housing 410 and the housing as shown in FIGS. 6, 7 and 8 which secures the conduit.

The housing 410 has a stepped cylindrical bore including a first bore 412, a second bore 413, a stop shoulder 414 between the bores 412 and 413, a third bore 415, and a shoulder 416 between bores 413 and 415. The distal end of housing 410 defines an opening to receive the conduit 420 and is provided with an inward radial flange 444.

The conduit 420 includes a forward end 421 which is located adjacent to the stop 414 upon insertion into the stepped bore and a pair of longitudinally spaced annular beads 422 and 424.

The retainer 430 fits into housing 410 in bore 417 and 419. Retainer 430 is provided with a plurality of resiliently deflectable fingers 440 having ends 442 to hold retainer 430 in housing 410. Upon insertion of the tubular seal retainer 430 into the bore of housing 410, the finger ends 442 snap passed the flange 444 of housing 410 and seat thereagainst whereby to lock the retainer 430 into the housing 410. Conduit 420 is locked in by fingers 441 latching behind bead 422.

The sealing structure comprises the seals and bushings being seated in an annular recess formed by bore 415 and bushing 435 and the seals engaging the outer periphery of the conduit 420, and the inner surface of bore 415.

Once complete connection occurs, fluid may now flow leak-free throughout the connector system.

In connector 410, annular bead 422 cannot be reliably formed on conduit 420 to act as a bushing in seal bore 415 without a secondary diameter sizing operation. In the patent which covers this connection 410, which is only one of this type of connector, such a second diameter sizing operation is not shown or discussed. In the disclosed connection 10, this second diameter sizing operation is necessary in some cases. It is done, when necessary, on the bushing portion 34 in FIG. 2, or as part of the bushing 34 attaching operation of FIG. 1.

Figure 12:
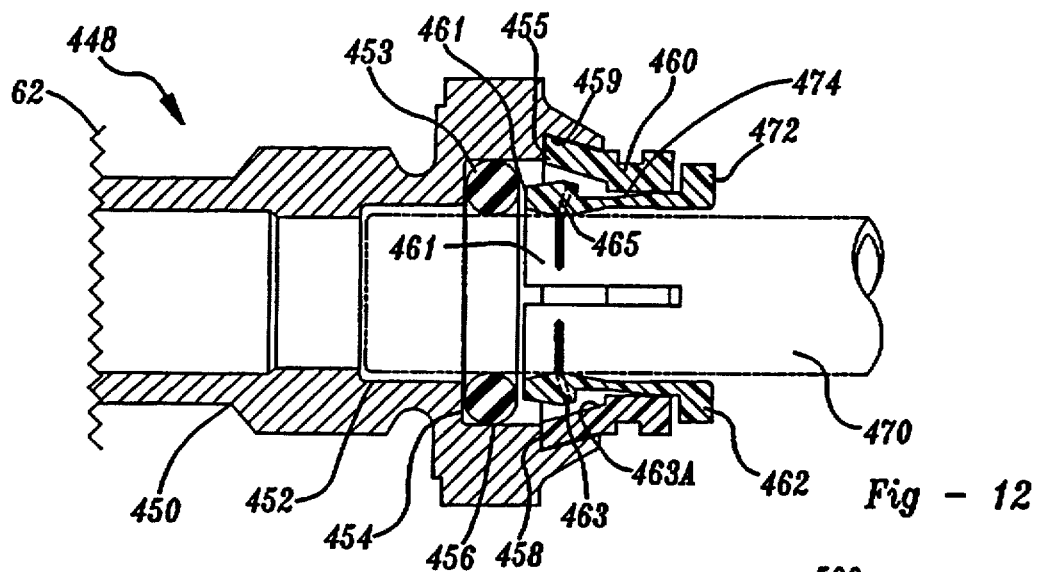
FIG. 12 is a side elevation view, partially in cross section of a fourth alternative connector assembly adaptable to be combined with the non-threaded small bore depth connector portions of FIGS. 1–8.

Referring to FIG. 12, a side elevation view of a connector assembly 448 which can be incorporated at the distal end 60 (see FIG. 6) of the branched conduit portion of FIGS. 6, 7 and 8, at break point line 62 as the second connector assembly 65, is shown. The terminal end 60 of the branched conduit is provided with a housing 450 which serves along with a coupling member 472 to interconnect with another conduit 470. The housing may be of any desired shape so long as clearance is maintained between this housing 450 and the housing as shown in FIGS. 6, 7 and 8 which secures the non-threaded conduit.

The housing 450 comprises a first bore 452 which is enlarged at a first annular step 454 into a second bore 456, the second bore receives a sealing ring 453 and is enlarged at a second annular step 458 into a third bore 459. The bore 452 provides a seat to receive an end of the conduit 470 and the bore 456 provides a seat to receive an annular seal 453 which forms a seal between the conduit 470 and the female portion 450, of connection 448. The third bore 459 extends to the end of the main section of the housing 450, and is squeezed down to contain part 460, which acts to retain coupling member 472.

The coupling member 472 has one end 461 extending into second bore 456 and an opposite end 462. A portion of the outside surface 474 of coupling member 472 has a tapered cam surface 463 extending from end 461 and converging towards open end 462. A collar 465, which is an insert metal part in deformable part 472, extends into the second bore 456 and is held in place by radially extending fingers which engage cam surface 463A of coupling member 460. Cam surface 463 cooperates with a cam surface 463A in 460 to engage and grip the conduit 470. Once complete connection occurs, fluid may now flow leak-free throughout the system. Gripper portions 465 are forced into engagement with conduit 477, and are responsible for retaining conduit 470 to female housing 450. There are many versions of this "gripper" type connection, which do not share many things in common with the disclosed connection.

Figure 13:
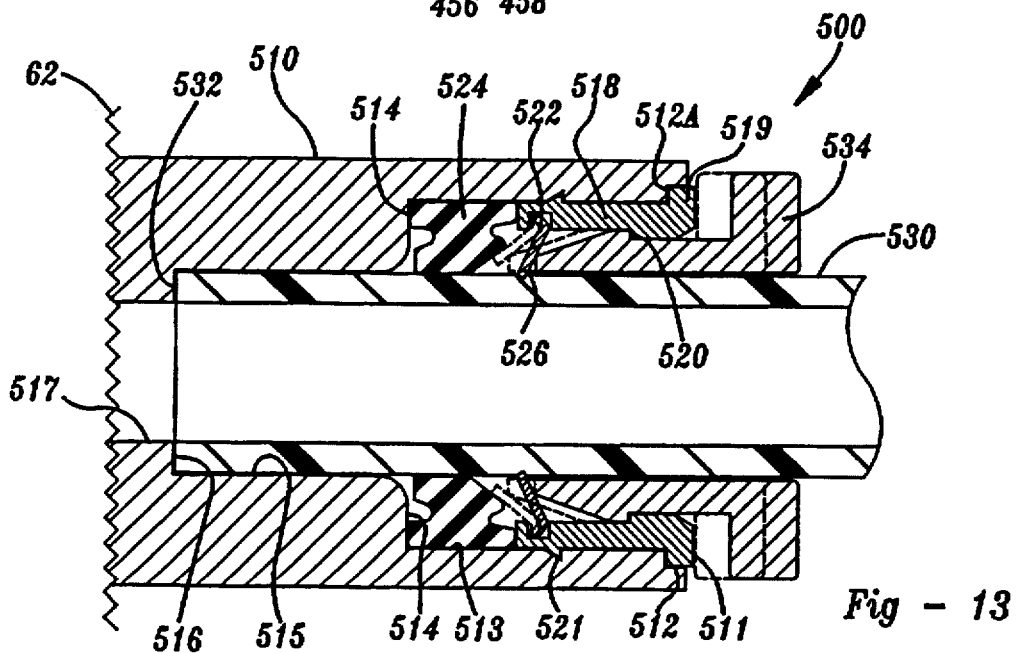
FIG. 13 is a side elevation view, partially in cross section of a fifth alternative connector assembly adaptable to be combined with the non-threaded small bore depth connector portions of FIGS. 1–8.

Referring to FIG. 13, a side elevation view of a connector assembly 500 which can be incorporated at the distal end 60 (see FIG. 6) of the branched conduit portion of FIGS. 6, 7 and 8, at break point line 62 as the second connector assembly 65, is shown. The terminal end 60 of the branched conduit is provided with a connector housing 510 which serves to interconnect to another conduit 530. The connection 500 is another example of the "gripper" type of connection, with the "gripping" of the male conduit 530 being achieved in a different releasable manner. Note also a non-O-ring sealing means 524.

The housing has a generally cylindrical configuration body although the external dimensions may be any other shape so long as clearance is maintained between this housing 510 and the housing which secures the conduit of FIGS. 6, 7 and 8.

The housing 510 comprises a succession of bores 512, 513, 515 and 517, each successive pair associated, respectively, with a first step 512A, a second step 514, and a third step 516 at successively farther positions. A section of tubing 530 has its end 532 abutting the step 516 and outer periphery encircled by the wall of the bore 515. A cylindrical guide sleeve 518 is fixed inside the housing 510 and includes an annular collar 519 in contact with the first step 512A. Guide sleeve 518 is provided with an outwardly extending barb 521 to engage a corresponding groove in the wall 513, a control step 520 on its inner surface prevents expulsion of releaser 534. An annular elastic seal 524 is located between the step 514 of housing 510 and the end of the guide ring 518.

A frusto-conical grip-ring 526 has its outer periphery seated by groove 522 and its inner periphery adapted to bite into the outer wall of the tubing 530 to prevent unwanted withdrawal of the tubing 530 from the housing 510. A release ring 534 is inserted into the housing and into the annulus formed between the sleeve 518 and the tubing 530. As a result of insertion the tubing 530 passes therethrough thereby to deflect the grip ring to the open position. An attempt to remove tube 530 from housing 510 causes release ring 526 to bite into tube 530. Since grip-ring 526 may have its inner periphery in contact with the release ring 534, the tube 530 can become dislodged from the housing 510 when disconnection is desired. Once complete connection occurs, fluid may now flow leak-free throughout the system. The connector 500 shares very little in common with the disclosed connector.

Figure 14:
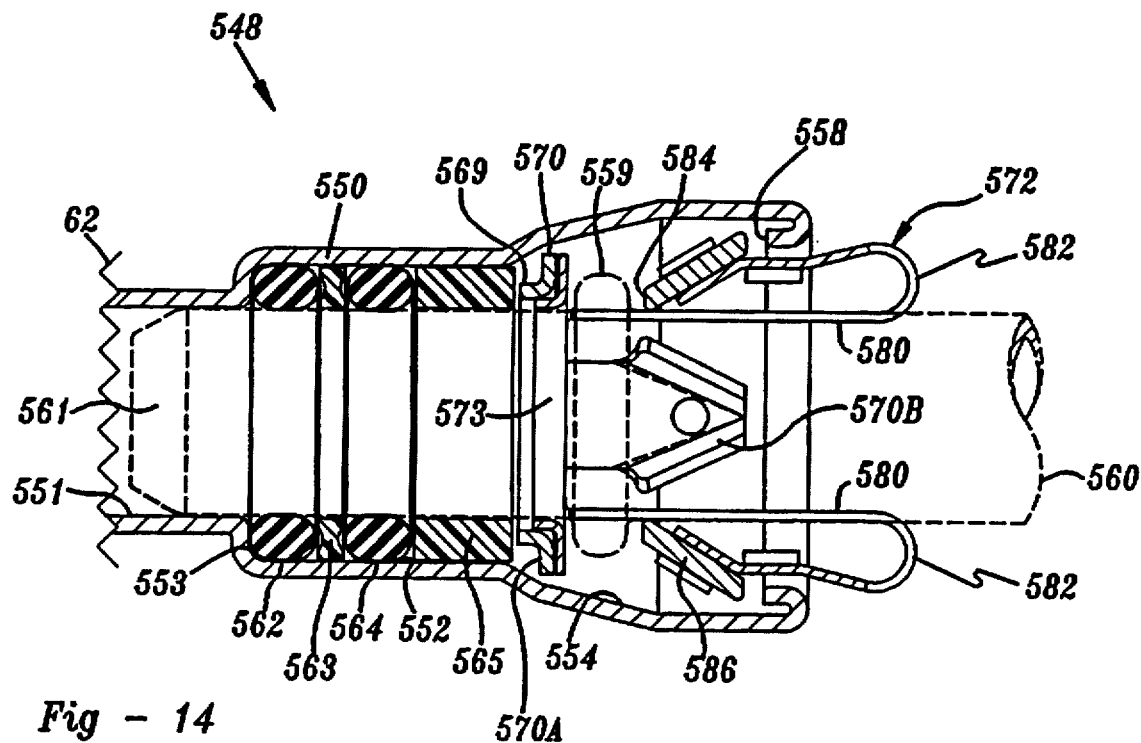
FIG. 14 is a side elevating view, partially in cross section of a sixth alternative connector assembly adaptable to be combined with the non-threaded small bore depth connector portions of FIGS. 1–8.

Referring to FIG. 14, a side elevation view of a connector assembly 548 which can be incorporated at the distal end 60 (see FIG. 6) of the branched conduit portion of FIGS. 6, 7 and 8, at break point line 62 as the second connector assembly 65, is shown. The terminal end 60 of the branched conduit is provided with a connector housing 550 which serves to interconnect with another conduit 560.

Connector 548 differs from the connection 400 in FIG. 11 by having the conduit 560 retained in the female 550 by a male retaining member 572 which has separated the springing requirement from the compressive requirement between abutting areas 558 on female 550, and 559 on conduit 560. Also a bushing/seal retainer 570 is employed to remove the bushing 565 and sealing means from dependence on the tube 560 beaded area 559, when the spring is deformed by overpressure or the spring portion 580 of retainer 572.

The connector housing 550 is generally comprised of a wall having varying diameters and defines three cylindrical shaped bore portions 551, 552 and 554. The first bore portion 551 houses the leading end 561 of conduit 560 upon complete insertion. A step 553 is provided as a transition between the bore 551 and the second bore portion 552. Contiguous with this step 553 are a pair of O-rings 562 and 564 separated by a bushing 563. Also contained within the second bore portion 552 is a bushing 565 having an axial bore into which the tube 560 inserts. The outer diameter of collar member 570 extends into the third bore portion 554 defined by the wall of the housing being frusto-conical in configuration.

Once the bushing/retainer 570 has been aligned and secured by arms 570B, a retaining member 572 is inserted into the third bore portion 554 and secured there within. The retaining member includes a collar 573 and arms 580 which extend radially outwardly therefrom. The retaining member has an annular lip 573 which fits tightly inside of the axial bore of the collar 570A so that the leading end of the retaining member 572 is contiguous with the collar 570. The arms 580 are out curved so that C-shaped end portions 582 thereof abut an incurved flange portion 558 of housing 550.

The retainer member 572 is also secured within the axial bore 554 of the housing 550 by retaining elements 584 and 586 which also abut the incurved flange portion 558 of housing 550. To prevent retainer slippage, the retainer elements 584 and 586 abut an annular ring 559 contained on conduit 560. As can be seen, the retainer elements 584 and 586 serve the double function of securing the retainer within the housing and preventing the undesired removal of the conduit. Once complete connection occurs, fluid may now flow leak-free throughout the system. In this connector, as in FIG. 11, the bushing 565 that holds in the sealing means, is not attached to the conduit.

Referring to FIG. 15, a side elevation view of a connector assembly 600 which can be incorporated at the distal end 60 (see FIG. 6) of the branched conduit of FIGS. 6, 7 and 8, at break point line 62 as the second connector assembly 65, is shown. The terminal end 60 of the branched conduit portion is provided with an annular coupling member 620, a tube 610 engaging the end of the conduit 611 and collar 616 containing a sealing ring 618 which is adapted to be locked together with a similar collar in a face-to-face relation. In FIG. 15 the collar 616 is one piece with conduit 611.

The coupling member 620 must be assembled over collar 616 prior to assembling tube 610 over conduit portion 611. The mating half is conduit portion 612 that is terminated at the end 621 that mates to 616, and also is sealed by O-ring 618. Mating end 621 has a ramped outer surface that steps inward toward the center axis of connector 600, to form locking abutting surface 622. Annular coupling portion 620 is terminated by springing areas 624, which engage locking area 622 of the mating part. When locking occurs between ends 616 and 621, seal 618 seals so that fluid may flow through portions 611 and 612.

Note that again the coupling 600 makes use of a machined groove for the sealing means when machined. In plastic, the surface of 616, that retains seal 618, may be molded smooth with no parting lines. The method of making the connection is very different from the connection 10 that is disclosed, and is included to show that couplings which seal in this fashion may be used with the disclosed connector 10.

Figure 16:
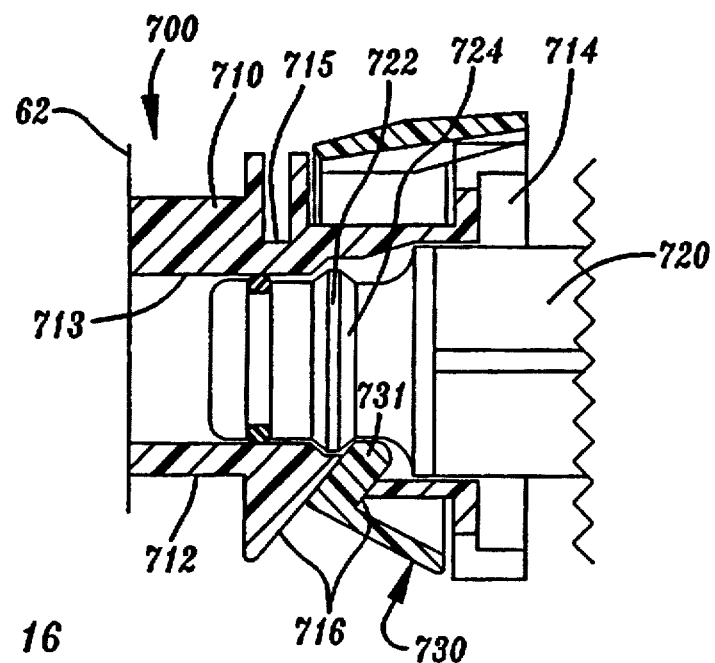
FIG. 16 is a side elevation view, partially in cross section of a ninth alternative connector assembly adaptable to be combined with the non-threaded small bore depth connector portions of FIGS. 1–8.

Referring to FIG. 16, a side elevation view of a connector assembly 700 which can be incorporated at the distal end 60 (see FIG. 6) of the branched conduit portion of FIGS. 6, 7 and 8, at break point line 62 as the second connector assembly 65, is shown. The connector assembly itself comprises a female housing 710 coupled to a male connector 720, for coupling to a conduit, and a locking member 730 for locking the male connector within the housing 710.

The housing 710 contains an axial bore defining a socket 713 at its distal most point. The outer surface of the housing is formed with a recess which is partially separated from the housing by an annular rib 714. Housing 710 is further formed with a pair of circumferentially spaced openings 716 through the wall of its recessed portion adjacent to the ends of the recess.

Annular rib 714 is formed with a slot 715 extending from the recess to the outer end of the housing wherein the ends of the annular rib 714 border a slot. Locking member 730 comprises an arcuate section receivable within the housing recess having a pair of oblique locking members 731 passing through openings 716 in the housing wall at its recess. Locking member 730 further includes a finger-gripping section formed centrally to the arcuate section being received within the slot of the housing 710.

The arcuate section of locking member 730, received within the recess allows the finger-engaging element to force the arcuate section radially outward by area 722 of male portion 720, thereby moving the locking members 730 in openings 716. The return of the locking fingers 731 after passage of male area 722 locks the connection. The male connector may become dislodged from the housing 710 by pressing the finger engagement element inwardly, the outer corners of arcuate section slide over tapered faces 724 of annular rib, moving the locking elements to their releasing positions. The connector 700 has a groove cut, or molded, into the male portion. This groove can have part lines or machining marks that may defeat the sealing. The connection 10 which is disclosed avoids this situation.

Referring to FIG. 17, a side elevation view of a connector assembly 748 which can be incorporated at the distal end 60 (see FIG. 6) of the branched conduit portion of FIGS. 6, 7 and 8, at break point line 62 as the second Connector assembly 65, is shown.

The terminal end 60 of the conduit portion is provided with a connector housing 750 which serves to adjoin a male connector 760 which secures a fluid conduit 770. The housing itself generally has a cylindrical external configuration body although the external dimensions may be any other shape so long as clearance is maintained between this housing 750 and the housing which secures the non-threaded conduit of disclosed.

The housing 750 comprises an axial bore 752 sized to receive the leading portion 762 of the connector male portion 760. The bore is provided with threads 754 that are connectable with corresponding threads 764 on the connector 760. A frusto-conical boss 756 extends inwardly of the bore and is sized to fit snugly within the flared end 772 of the conduit 770 upon complete insertion. A fluid-tight seal is assured when the male connector 760 is screwed into the housing 750 so that the circumferential wall 758 of the boss 756 is engaged by the corresponding wall 766 of the male conduit. This method of sealing requires that at least a circle of perfect engagement exist between wall 758 and wall 766. Since metal is much less deformable, compared to the deformability of an elastomer, sealing with elastomers has proven to be much more successful.

Figure 18:
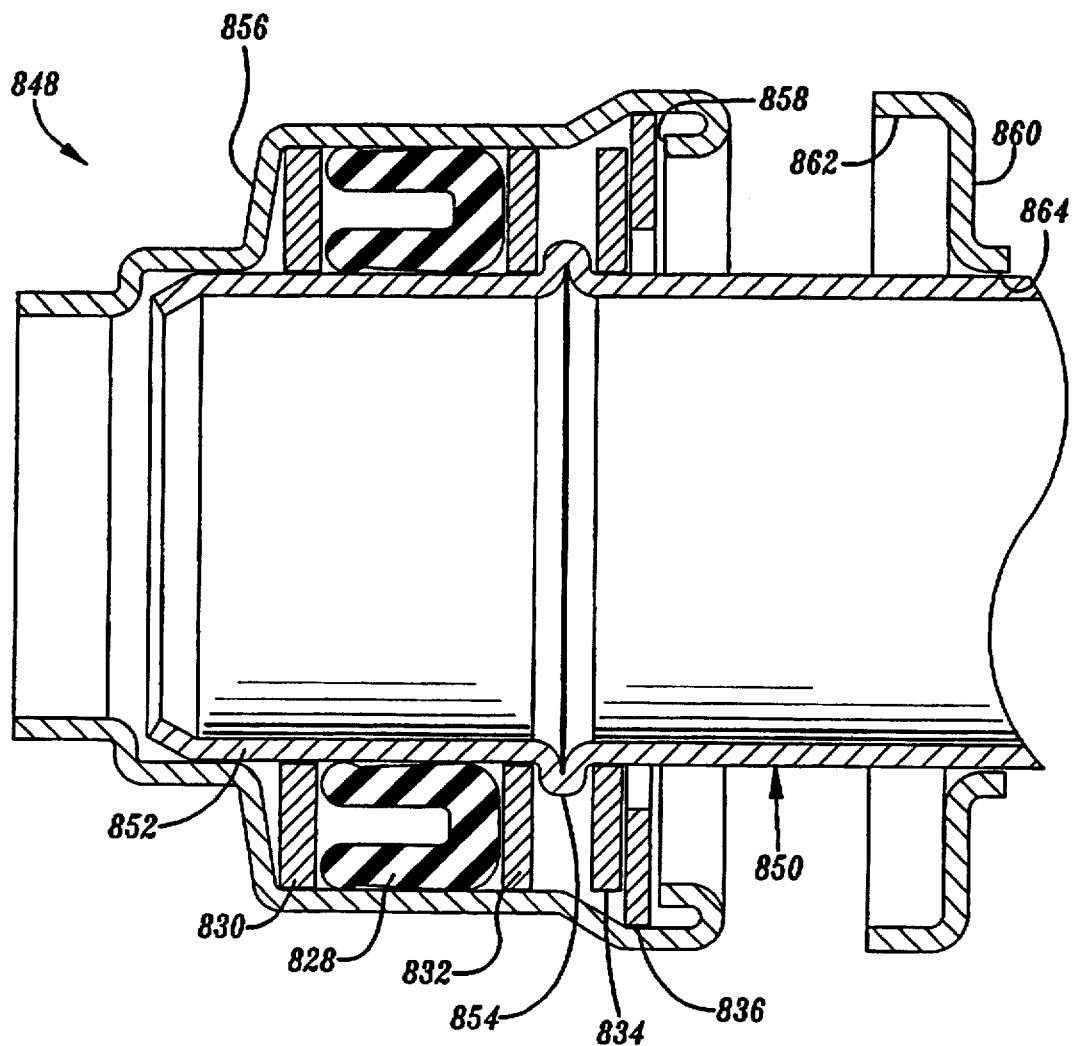
FIG. 18 is a side elevation view in cross section of the disclosed connector with a beaded conduit to provide an abutting wall on the male part.

Referring to FIG. 18, a further embodiment of the disclosed connection concept 10 is shown as connection 848. The difference of connection 848 from the connection 10 of FIG. 4 is the sealing means, a "U" cup type elastomer seal 828 instead of an O-ring, and the male tubular portion does not require any internal reinforcement, and the male conduit may be beaded. The connection 848 still remains one that allows a good sealing surface to be put onto the male and female because there are no grooves for the sealing means. It differs from other retaining methods because an operation has been done on the male to achieve an abutting wall, but this abutting wall is not used directly in the transfer of male pull out force to the female housing, an intermediate part is required to transmit the force from the male to the part that transfers the pull apart forces to the female housing.

In operation connection 848 is a female housing 856 (a thin walled housing) with bores to receive the male 850 which mounts bushing 830 (which is somehow attached to male 850) and male 850 bead 854 (which serves the dual purpose of preventing expulsion of bushing 832 and sealing means 828 with the inner connector portion of tube bead 854, and providing a retaining abutting surface for intermediate washer shaped retainer ring 834 which transfers the male/female separation forces to snap-in retainer 836), and snap-in retainer 836, which abuts housing 856 at abutting wall 858.

The surfaces that are sealed by sealing means 828 are very smooth (because of the no-groove for sealing means shape allows standard manufacturing methods to be used that produce a very smooth surface) and when the male and female are joined and held together by snap-retainer 836, a sealed fluid carrying conduit connection is the result.

Also shown in FIG. 18 is a seal 860 that seals the internal areas of housing 856 and the external area of conduit 850 from intrusion of material that is exterior to housing 856 and conduit 850. In the embodiment shown, the inside lip 862 of seal 860 seals over the exterior of housing 856, and sealing lip 864 seal over conduit 850.

If it were not convenient to seal over housing 856, then seal 860 could be constructed to seal to the inside of the open end of the female housing (this embodiment is not shown).

Various methods of retaining and mounting seals and bushings have been shown for the connections that may be used in combination with the disclosed connection. These combined connectors were chosen to be representative of a type of connector that mounts a seal as shown, or uses bushings as shown, or employs a retainer that operates as shown. Many connectors that employ the shown method of mounting a seal, mounting a bushing, or retaining, are of the type of connector that is shown. It is not desired to patent these types of connections, only to show that they may be used with the disclosed connection.

A connector joins and seals two major parts (ends) together, and either of the two parts (ends) that are shown in the figures may be an end of a connector that combines with at least one of the tow ends (parts) of the disclosed connection.

While the above description has described the connection concept of the invention, it will be appreciated that the invention is susceptible to modification, variation, and change without departing from the proper scope or fair meaning of the accompanying claims.

I claim:

1. A connector assembly for use in communicating a fluid, said connector assembly comprising:

a male conduit having an expanded diameter member firmly affixed to a first peripheral portion thereof;

a female housing having a longitudinal bore therethrough, said female housing further having a substantially lateral abutting wall, a portion of said male conduit fitting within said female housing;

a seal sealably surrounding a second and continuously smooth peripheral portion of said male conduit and sealing against a smooth continuous internal portion of said female housing;

a bushing firmly affixed around a third peripheral portion of said male conduit;

a retainer associated with said female housing, said retainer having at least a portion thereof fitting within said female housing longitudinally internal to said abutting wall;

said conduit being prevented from separation from said housing by said retainer which expands into said housing, and ring means for abutting one side of said retainer for preventing the separation of said conduit from said housing.

2. The connector of claim 1 wherein said bushing is longitudinally disposed between said expanded diameter member and said seal.

3. The connector of claim 1 where said conduit includes said expanded diameter member as an integral part of said conduit and of the same material of said conduit.

4. The connector of claim 1 where said conduit includes said expanded diameter member as a separate bushing that is permanently attached to said conduit.

5. The connector of claim 1 where said male conduit includes a central axis and said female housing includes a central axis and wherein said male conduit includes said expanded diameter member formed of said conduit that is spaced apart from said housing, said expanded diameter member and bushing engaging said male conduit and female housing to limit the angular departure of said male conduit axis from said female housing axis, said bushing being permanently affixed to said conduit.

6. The connector of claim 5 where said reinforcement includes a portion that limits said axial departure and prevents removal of said seal from installation over said conduit.

7. The connector of claim 6 where said portion of said reinforcement prevents removal of a separate other bushing that acts to limit the said axial relative movement between said conduit and said housing, said other bushing is located between said seal and said portion of said reinforcement.

8. The connector of claim 1 where said conduit is reinforced on the inside thereof by a separate reinforcement that is located adjacent an end area of said conduit.

9. The connector assembly of claim 1 which includes a means to urge said retainer into said housing.

10. The connector assembly of claim 1 which includes a means to urge said retainer into said housing by urging a tool that is used to cause a reduction in the outside diameter.

11. The connector of claim 1 where said housing causes a reduction of the outside diameter of said retainer.

12. The connector of claim 1 wherein said seal seals the internal portion of said housing from intrusion of material external to said conduit and said housing.

13. The connector of claim 1 which is hand releasable.

14. The connector of claim 1 further comprising a second housing coupled to said first housing.

15. A combination connector assembly for use in communicating a fluid, said connector assembly comprising:

a first male conduit having an expanded diameter member surrounding a first peripheral portion thereof;

a first female housing having a longitudinal bore therethrough, said first female housing further having a substantially lateral abutting wall, a portion of said first male conduit fitting within said first female housing;

a first seal sealably surrounding a second and continuously smooth peripheral portion of said first male conduit and sealing against an internal portion of said first female housing;

a first bushing firmly affixed around a third peripheral portion of said first male conduit;

a first snap together and releasable retainer carried on and fastened to said first female conduit, said first retainer having at least a portion thereof fitting within said first female housing longitudinally internal said abutting wall; and a second female housing coupled to said first male conduit for fluid movement therebetween;

a second male conduit sealably coupled into said second female housing; and a second and releasable retainer fastening said second male conduit to said second female housing.

16. The combination connector assembly of claim 15 wherein a radial groove is disposed within said second female housing.

17. The combination connector assembly of claim 15 wherein said retainer expands into an area provided in said second female housing.

18. The combination connector assembly of claim 17 wherein said second retainer creates an abutting wall on the male conduit.

19. The combination connector assembly of claim 15 wherein one of said male conduits is permanently attached to one of said female housings thereby forming a joint therebetween.

20. The combination connector assembly of claim 19 wherein at least one of said male conduits enabling rotational movement at said joint.

21. The combination connector assembly of claim 20 further comprising a rotation limiting member preventing over-rotation of said joint.

22. A combination connector assembly comprising:

a male conduit coupled to a female housing against removal therefrom thereby forming an angled joint therebetween;

said male conduit is flexible in relation to said female housing for allowing pivoting movement at said joint; and a pivot limiting means cooperating with said female conduit said pivot limiting means extending from said male conduit toward said female conduit such that said pivot limiting means contacts said female conduit for preventing over pivoting of said joint.

23. The combination connector assembly of claim 22 wherein said pivot limiting means includes at least one member transversely extending from said male housing toward said female housing.

24. A connector comprising:

a male conduit having first and second branches angularly and flexibly coupled together; and a rotation limiting means including at least one projection extending from one of said branches which is positioned inside a bore of a female conduit for preventing circumferential over-rotation between said male conduit first and second branches and the female conduit.

* * * * *

UNITED STATES PATENT AND TRADEMARK OFFICE
CERTIFICATE OF CORRECTION

PATENT NO. : 5,775,738

DATED : July 7, 1998

INVENTOR(S) : Donald D. Bartholomew

It is certified that error appears in the above-identified patent and that said Letters Patent is hereby corrected as shown below:

Title Page, [73] Assignee, delete "Propiretary" and substitute --Proprietary-- therefor Col. 2, line 33, delete "position" and substitute --is positioned-- therefor Col. 2, line 59, delete "conduit." and substitute --conduit;-- therefor Col. 3, line 29, delete "elevating" and substitute --elevation-- therefor Col. 4, line 38, delete the hyphen in "(not-shown)"

Col. 5, line 62, delete "squeeze" and substitute --the squeezed-- therefor

Col. 6, line 43, delete "or" and substitute --of-- therefor

Col. 7, line 1, delete "busing" and substitute --bushing-- therefor

Col. 7, line 49, delete "features:" and substitute --features.-- therefor

Col. 8, lines 8-9, delete "conduit: But" and substitute --conduit, but-- therefor Col. 8, line 9, delete "purposes." and substitute --purposes:--

Col. 8, line 10, delete "Act" and substitute --act-- therefor

Col. 8, line 11, delete "female." and substitute --female;-- therefor

Col. 8, line 12, delete "Support" and substitute --support-- therefor

Col. 8, line 12, delete "portion." and substitute --portion; and-- therefor

Col. 8, line 13, delete "Prevent" and substitute --prevent-- therefor

UNITED STATES PATENT AND TRADEMARK OFFICE
CERTIFICATE OF CORRECTION

PATENT NO. : 5,775,738
DATED : July 7, 1998
INVENTOR(S) : Donald D. Bartholomew

It is certified that error appears in the above-identified patent and that said Letters Patent is hereby corrected as shown below:

Col. 8, line 37, "FIGS. I" should be --FIGS. 1--

Col. 10, line 12, after "have" insert --a--

Col. 11, line 45, delete "AND" and substitute --and-- therefor

Col. 13, line 48, delete "passed" and substitute --past-- therefor

Col. 17, line 4, delete "Connector" and substitute --connector-- therefor

Col. 17, line 13, delete "of"

Col. 17, line 25, delete "exist" and substitute --exists-- therefor

Col. 17, line 57, delete "because of" and "for"

Col. 18, line 18, delete "tow" and substitute --two-- therefor

Signed and Sealed this

Seventh Day of September, 1999

Attest:

Q. TODD DICKINSON

Attesting Officer

Acting Commissioner of Patents and Trademarks